United States Patent
Haller

(10) Patent No.: US 12,229,618 B2
(45) Date of Patent: Feb. 18, 2025

(54) LIQUID IMPERVIOUS SMART CARD READER

(71) Applicant: Elo Touch Solutions, Inc., Knoxville, TN (US)

(72) Inventor: Jeffrey Haller, Redwood City, CA (US)

(73) Assignee: Elo Touch Solutions, Inc., Knoxville, TN (US)

( * ) Notice: Subject to any disclaimer, the term of this patent is extended or adjusted under 35 U.S.C. 154(b) by 0 days.

(21) Appl. No.: 18/344,060

(22) Filed: Jun. 29, 2023

(65) Prior Publication Data

US 2023/0342565 A1 Oct. 26, 2023

Related U.S. Application Data

(63) Continuation of application No. 17/875,735, filed on Jul. 28, 2022, now Pat. No. 11,748,580, which is a continuation of application No. 17/141,860, filed on Jan. 5, 2021, now Pat. No. 11,443,123.

(51) Int. Cl.
*G06K 7/00* (2006.01)

(52) U.S. Cl.
CPC ......... *G06K 7/0078* (2013.01); *G06K 7/0026* (2013.01); *G06K 7/0065* (2013.01); *G06K 7/0073* (2013.01)

(58) Field of Classification Search
CPC .. G06K 7/0078; G06K 7/0026; G06K 7/0065; G06K 7/0073; G06K 7/0021; G06K 13/0875; G06K 13/0868; G06F 1/1626; G06F 1/1656
See application file for complete search history.

(56) References Cited

U.S. PATENT DOCUMENTS

| | | | |
|---|---|---|---|
| 5,257,164 A | 10/1993 | Perez et al. | |
| 5,698,832 A | 12/1997 | Someya et al. | |
| 5,850,079 A * | 12/1998 | Ohwa | G06K 13/0875 235/475 |
| 5,933,812 A | 8/1999 | Meyer et al. | |

(Continued)

OTHER PUBLICATIONS

International Search Report and Written Opinion of the International Searching Authority directed to related International Patent Application No. PCT/US2022/011072, mailed Jun. 24. 2022; 18 pages.

*Primary Examiner* — Sonji N Johnson
*Assistant Examiner* — Asifa Habib
(74) *Attorney, Agent, or Firm* — Sterne, Kessler, Goldstein & Fox P.L.L.C.

(57) ABSTRACT

Some embodiments include a smart card reader system that includes a card reader cavity that is impervious to liquid. The card reader cavity includes a secure card reader (SCR) holder bonded to a printed circuit board (PCB), to provide a liquid barrier between the SCR holder and the PCB. The PCB includes an SCR spring contact connector. The card reader cavity can receive a smart card including an integrated circuit (IC), where the IC is coupled to the SCR spring contact connector. A processor coupled to the SCR spring contact connector, can receive an input regarding a transaction using data of the smart card, and execute the transaction. In some embodiments a roller system seals the card reader cavity when the smart card reader system is not in use.

18 Claims, 19 Drawing Sheets

(56) References Cited

U.S. PATENT DOCUMENTS

| | | | |
|---|---|---|---|
| 5,949,047 A | 9/1999 | Abe et al. | |
| 6,176,426 B1 | 1/2001 | Kanayama et al. | |
| 6,834,801 B2 | 12/2004 | Ishikawa et al. | |
| 8,251,293 B2 | 8/2012 | Nagata et al. | |
| 8,690,058 B2 | 4/2014 | Watanabe et al. | |
| 9,027,834 B2 | 5/2015 | Watanabe et al. | |
| 9,697,390 B2 | 7/2017 | Kuwaki | |
| 9,858,558 B1 | 1/2018 | Cardinal | |
| 10,747,966 B2 | 8/2020 | Miyazawa | |
| 10,810,570 B1 | 10/2020 | Martin et al. | |
| 11,443,123 B2 | 9/2022 | Haller | |
| 11,748,580 B2 | 9/2023 | Haller | |
| 2009/0146816 A1 | 6/2009 | Patel et al. | |
| 2010/0147946 A1* | 6/2010 | Fujita | G06K 13/0893 235/441 |
| 2011/0075338 A1* | 3/2011 | Tang | G06F 1/1684 361/679.4 |
| 2011/0240738 A1 | 10/2011 | Mizawa et al. | |
| 2014/0158768 A1* | 6/2014 | Ray | H04K 3/825 235/449 |
| 2015/0076230 A1 | 3/2015 | Woolf et al. | |
| 2015/0213334 A1 | 7/2015 | Ishikawa et al. | |
| 2015/0287289 A1* | 10/2015 | Lewis | G07F 19/2055 235/379 |
| 2016/0140365 A1* | 5/2016 | Takahashi | G06K 7/0056 235/486 |
| 2017/0026498 A1 | 1/2017 | Goldfain et al. | |
| 2017/0086312 A1 | 3/2017 | Ahmad et al. | |
| 2018/0288871 A1 | 10/2018 | Fujimoto et al. | |
| 2019/0005279 A1 | 1/2019 | Miyazawa | |
| 2019/0385028 A1* | 12/2019 | Ozawa | G07D 11/225 |
| 2020/0381010 A1* | 12/2020 | Tanaka | G06K 1/125 |
| 2022/0215187 A1 | 7/2022 | Haller | |

\* cited by examiner

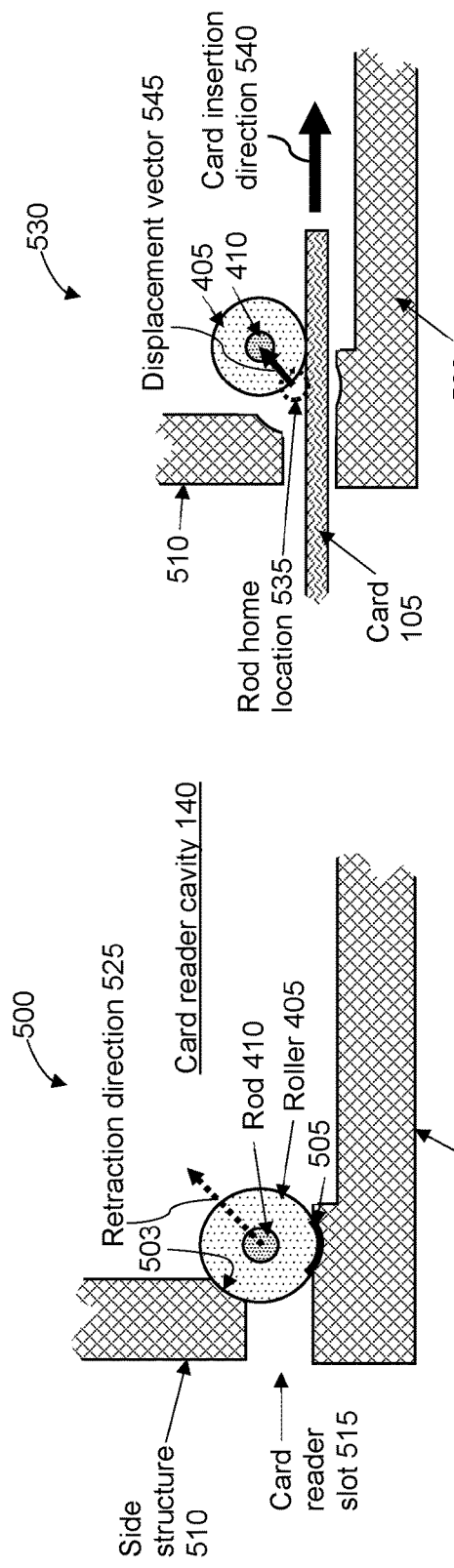
FIG. 5A
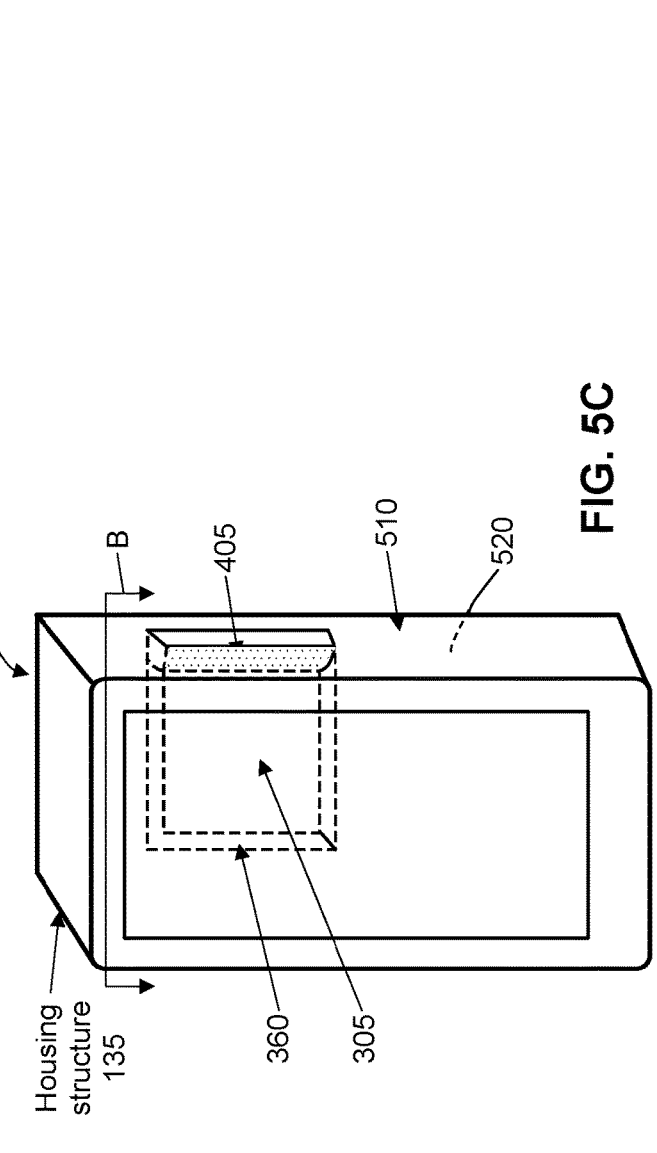
FIG. 5B
FIG. 5C

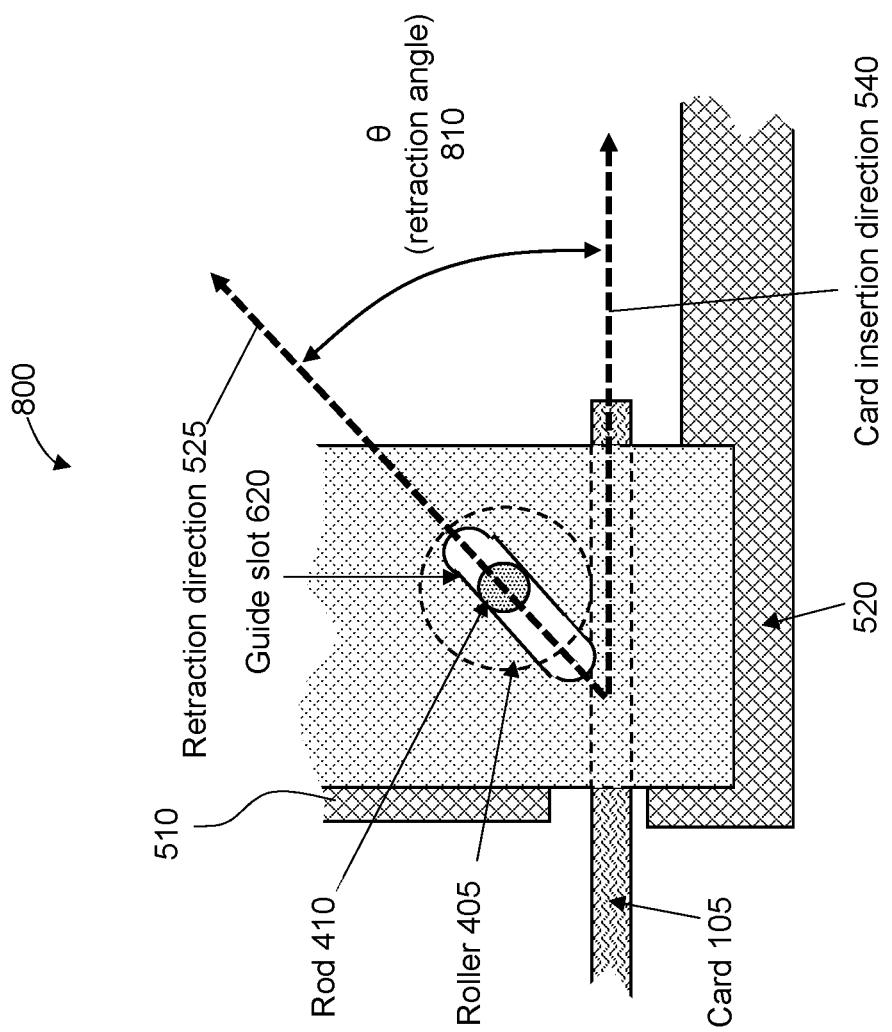

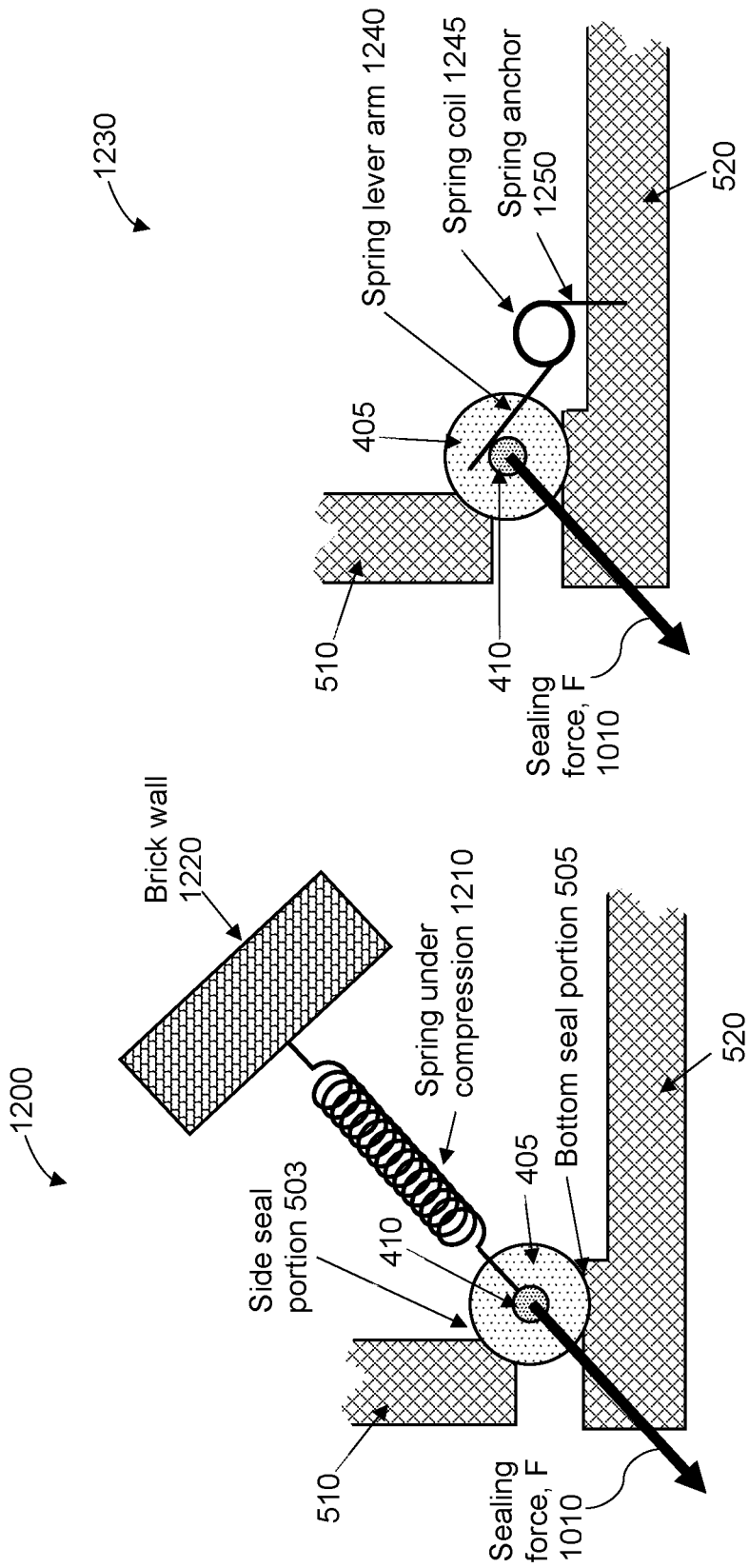

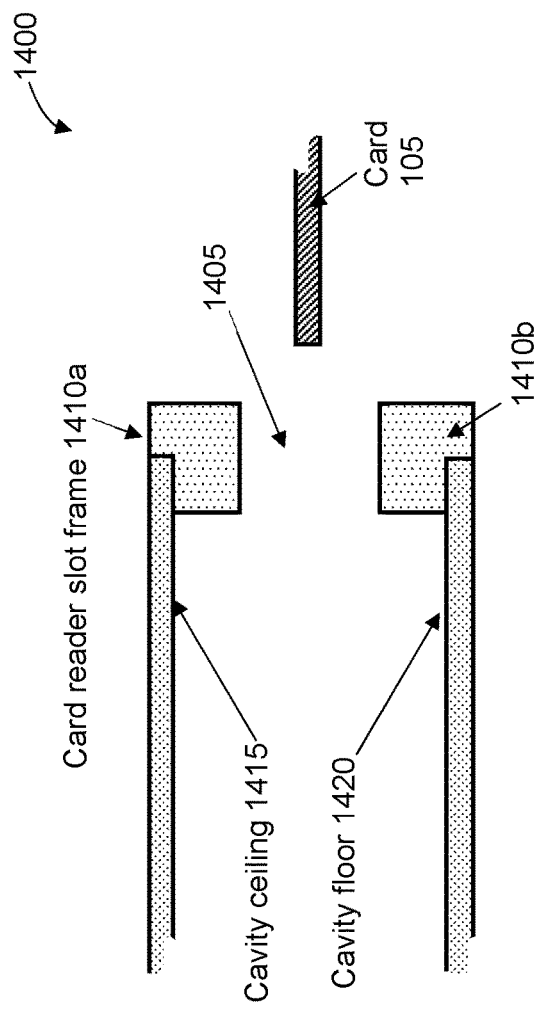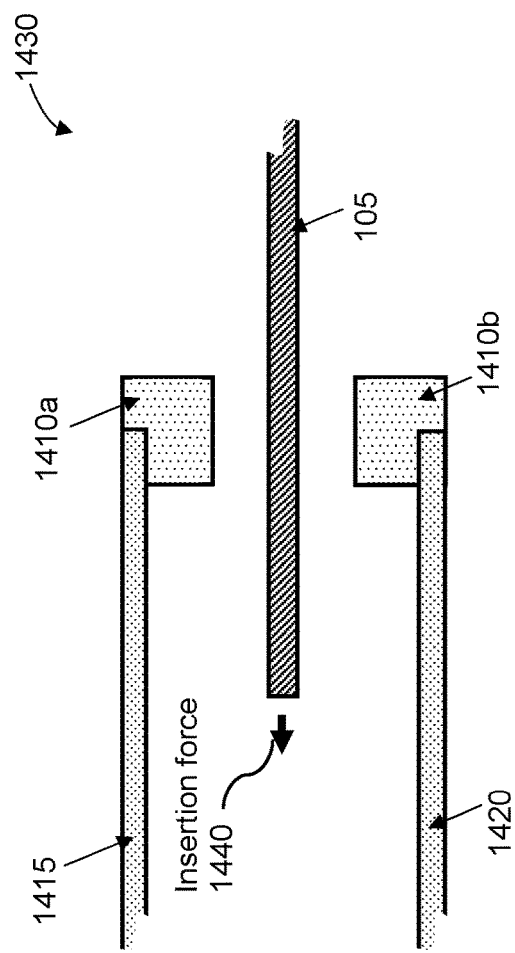
FIG. 14A
FIG. 14B

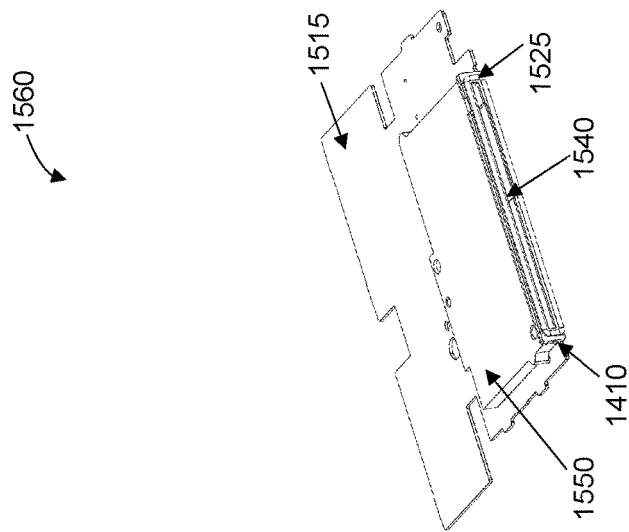
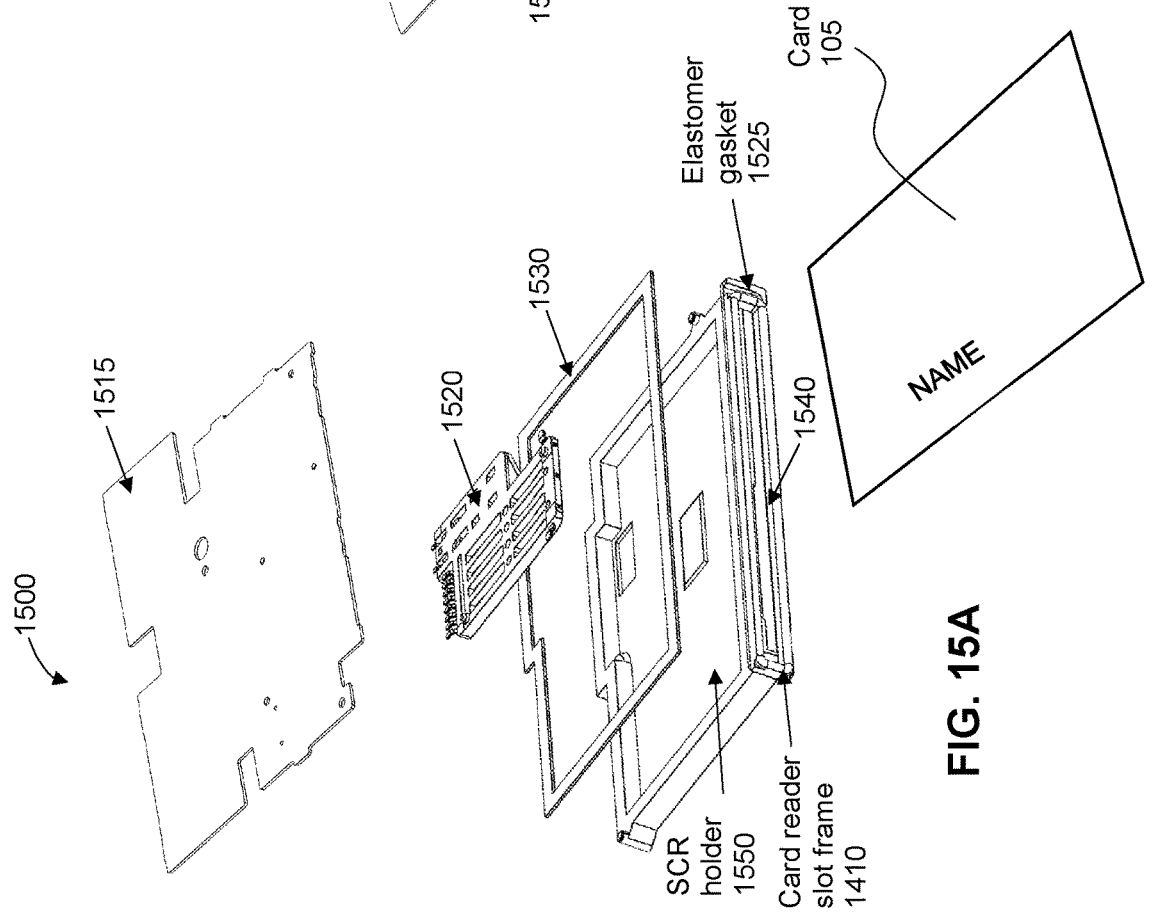
FIG. 15B
FIG. 15A

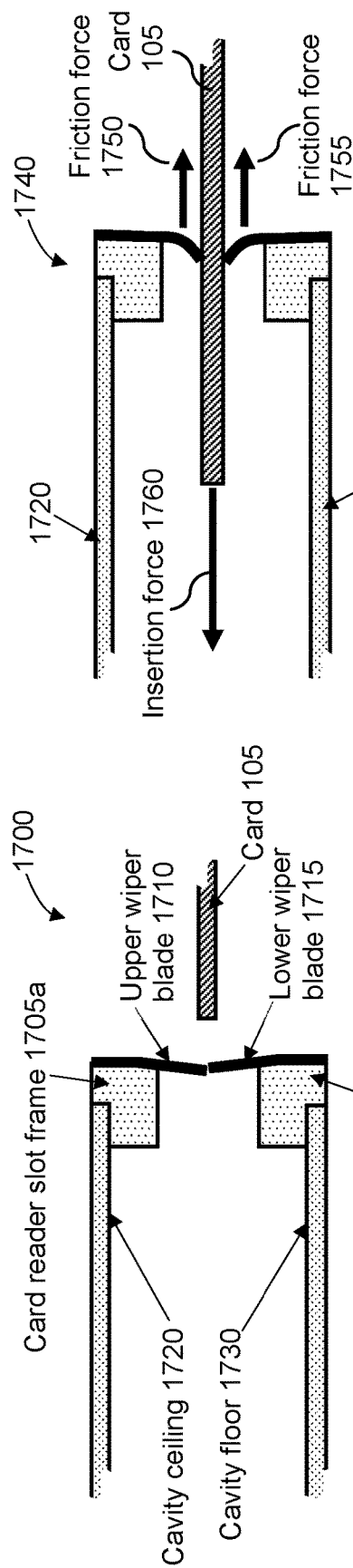
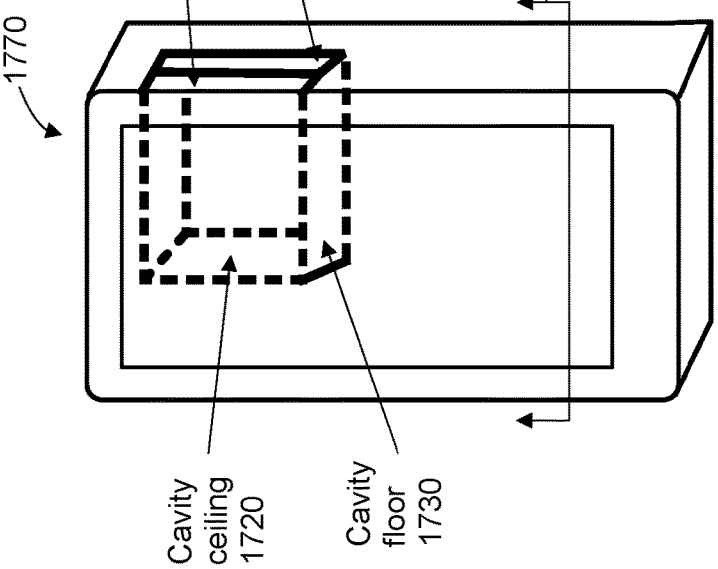
FIG. 17A
FIG. 17B
FIG. 17C

LIQUID IMPERVIOUS SMART CARD READER

CROSS-REFERENCE TO RELATED APPLICATIONS

This application is a continuation application of U.S. Nonprovisional application Ser. No. 17/875,735, filed Jul. 28, 2022, entitled Liquid Impervious Smart Card Reader, which is a continuation application of U.S. Nonprovisional application Ser. No. 17/141,860, filed on Jan. 5, 2021, now U.S. Pat. No. 11,443,123, entitled, Liquid Impervious Smart Card Reader, which is incorporated herein by reference in their entireties.

BACKGROUND

Field

The present disclosure relates generally to a card reader device, and in particular, a portable liquid impervious smart card reader device.

Background Art

Portable card reader devices are used to execute financial transactions.

SUMMARY

Some embodiments include a system, method, apparatus, and/or combination(s) or sub-combination(s) thereof, for a liquid impervious smart card reader that can include a touchscreen device. Some embodiments include a liquid impervious smart card reader system that includes a card reader cavity. The card reader cavity can include a secure card reader (SCR) holder bonded to a printed circuit board (PCB), where the bond provides a liquid barrier between the SCR holder and the PCB. The bond can include: a pressure sensitive adhesive (PSA), a thermoset adhesive, or an epoxy adhesive. The PCB can include an SCR spring contact connector and the card reader cavity is configured to receive a smart card including an integrated circuit (IC), where the IC is positioned to be coupled to the SCR spring contact connector. A processor coupled to the SCR spring contact connector can receive an input regarding a transaction using data of the smart card, and based on the input, execute the transaction.

The card reader cavity includes a liquid impervious seal that separates the card reader cavity from an interior of the smart card reader system. The liquid impervious seal can include an elastomer gasket. In some embodiments, the SCR holder is a singular molded structure made of plastic including but not limited to acrylonitrile butadiene styrene. The single molded structure can include a card reader cavity floor and a card reader cavity wall, where a material of the card reader cavity floor includes a hydrophobic material, and where a material of the card reader cavity wall includes a hydrophilic material. The interior surfaces of the card reader cavity can include a liquid-impervious conformal coating.

In some embodiments the card reader cavity further includes a roller in a home position that seals an opening of the card reader cavity. A smart card being inserted into the card reader cavity moves the roller from the home position according to a displacement vector based on a retraction angle, $\theta$, where the retraction angle, $\theta$ comprises an angle between a direction of the displacement vector and a direction of an insertion of the smart card.

In some embodiments a liquid impervious smart card reader system includes a card reader cavity with a roller in a home position that seals an opening of the card reader cavity. The card reader cavity is configured to receive a smart card via the opening, where the smart card being inserted into the card reader cavity moves the roller from the home position according to a retraction direction based on a retraction angle, $\theta$. The card reader cavity also includes a PCB that includes an SCR spring contact connector. The smart card includes an IC, and the smart card can be positioned where the IC is coupled to the SCR spring contact connector. A processor coupled to the SCR spring contact connector can receive input via electronic communications with the smart card inserted, regarding a transaction using data of the smart cart. Based on the input, the processor can execute the transaction.

The roller can include a conformable material supported by a rod where the conformable material and the rod rotate as a single unit according to the conformable material making contact with the smart card. The rod can include metal or plastic, and the conformable material can include rubber, foam, silicon, or an elastomer. The card reader cavity includes an opening adjacent to a side structure and bottom structure of the housing structure of the liquid impervious smart card reader system, where the roller in the home position makes contact with both the side structure and the bottom structure to prevent a liquid from entering the card reader cavity. In some embodiments the liquid impervious smart card reader includes parallel guide plates with parallel guide slots, where a motion of the rod in the retraction direction is constrained by the parallel guide slots. Each end of the rod that protrudes through a parallel guide slot of the parallel guide slots includes a rod end cap whose diameter is larger than a width of a guide slot. When the parallel guide slots are straight, the retraction angle, $\theta$, includes an angle between the retraction direction and a direction of the insertion of the smart card.

A seal-force spring anchored to a housing structure of the smart card reader system includes a spring lever arm that presses against the rod to apply a sealing force, F, in a direction opposite the retraction direction. A horizontal component of the sealing force, F, equals $F \cdot \cos \theta$ and a vertical component of the sealing force, F, equals $F \cdot \sin \theta$, wherein $\theta$ is the retraction angle. Values of the retraction angle, $\theta$, are greater than or equal to 40° and less than or equal to 50°.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 5A illustrates a rod in a home position of an example system of a liquid impervious smart card reader with a sealed slot, according to an exemplary embodiment of the disclosure;

FIG. 5B illustrates a rod in a retracted position of an example system of a liquid impervious smart card reader with a smart card inserted, according to an exemplary embodiment of the disclosure;

FIG. 5C illustrates another example system of a liquid impervious smart card reader, according to an exemplary embodiment of the disclosure.

FIG. 8 illustrates a retraction angle of an example system of a liquid impervious smart card reader with a smart card inserted, according to an exemplary embodiment of the disclosure;

FIG. 12A illustrates a conceptual seal-force spring of an example system of a liquid impervious smart card reader with a sealed slot, according to an exemplary embodiment of the disclosure;

FIG. 12B illustrates a seal-force spring of an example system of a liquid impervious smart card reader with a sealed slot, according to an exemplary embodiment of the disclosure;

FIG. 14A illustrates a cross-section view of an example system of a liquid impervious smart card reader, according to an exemplary embodiment of the disclosure;

FIG. 14B illustrates minimal insertion force in a cross-section view of an example system of a liquid impervious smart card reader, according to an exemplary embodiment of the disclosure;

FIG. 15A illustrates components of an example system of a liquid impervious smart card reader, according to an exemplary embodiment of the disclosure;

FIG. 15B illustrates an inverted view of assembled components of an example system of a liquid impervious smart card reader, according to an exemplary embodiment of the disclosure;

FIG. 17A illustrates a cross-section view of an example system of a smart card reader;

FIG. 17B illustrates friction forces on a cross-section view of an example system of a smart card reader; and FIG. 17C illustrates another example system of a smart card reader.

Figure 1A:
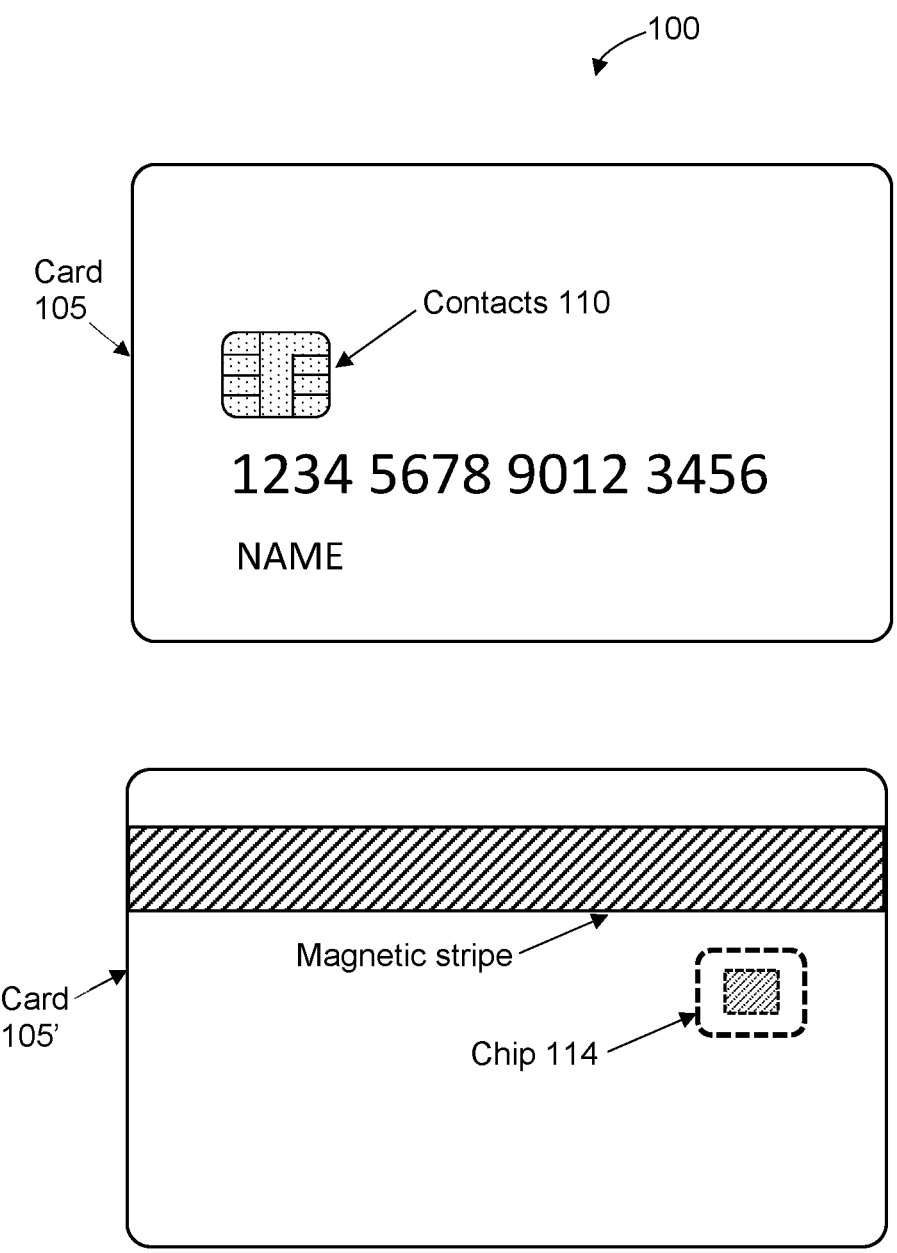
FIG. 1A illustrates an example smart card used in a liquid impervious smart card reader, according to an exemplary embodiment of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

FIG. 1A illustrates example 100 of card 105 used in a liquid impervious smart card reader, according to an exemplary embodiment of the disclosure. Card 105 can be a smart card that includes but is not limited to a credit card or a debit card. Card 105 can be used for financial transactions. Card 105 includes contacts 110 that communicatively couple with card reader contacts of a liquid impervious smart card reader to enable a transaction (e.g., a financial transaction.) Card 105' illustrates an inversion of card 105. Card 105' illustrates chip 114 that can be an integrated circuit (IC) that is embedded in card 105' (and card 105.) Contacts 110 are coupled to chip 114. Card 105 may include a magnetic stripe. Chip 114 distinguishes card 105 as being a smart card compared to other cards that only have a magnetic stripe.

Figure 1C:
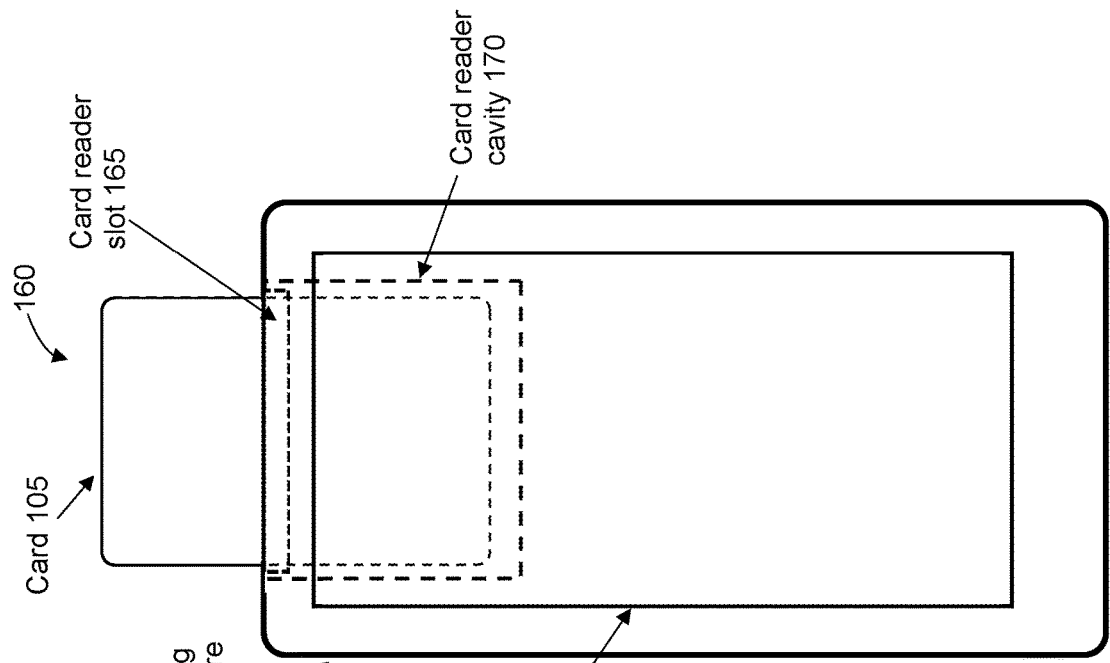
FIG. 1C illustrates another example system of a liquid impervious smart card reader, according to an exemplary embodiment of the disclosure.
Figure 1B:
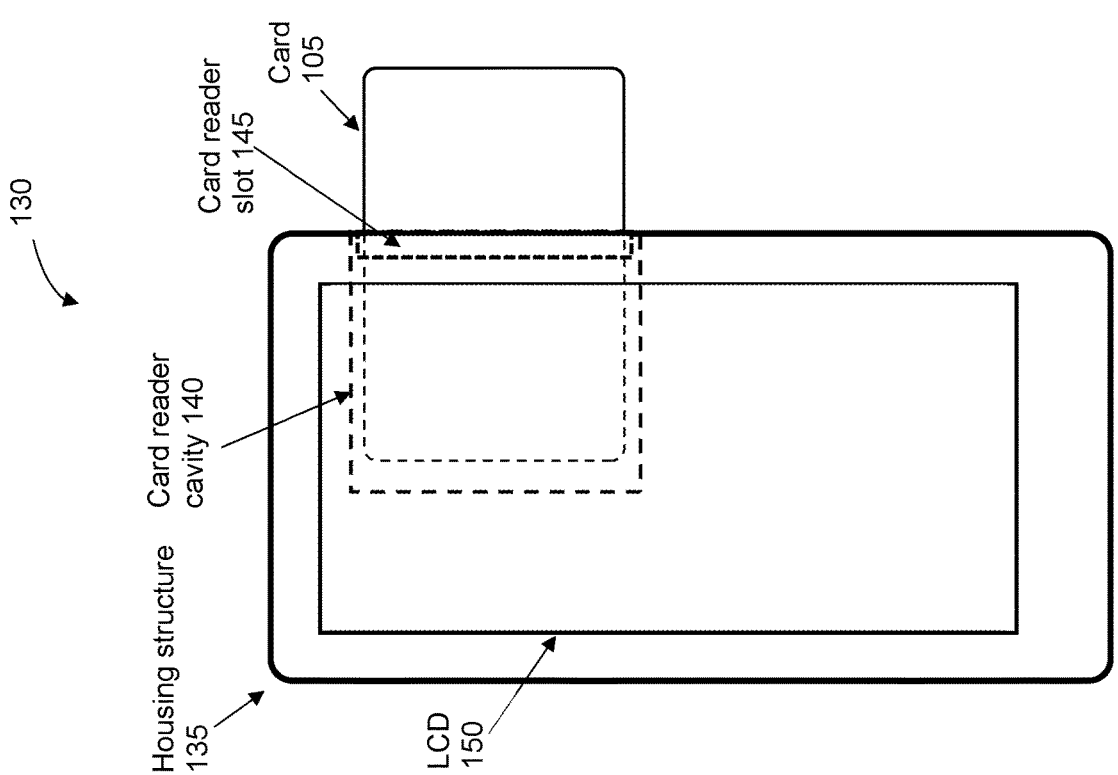
FIG. 1B illustrates an example system of a liquid impervious smart card reader, according to an exemplary embodiment of the disclosure.

FIG. 1B illustrates example system 130 of a liquid impervious smart card reader, according to an exemplary embodiment of the disclosure. System 130 includes housing structure 135, card reader cavity 140, and card reader slot 145. Card 105 can be inserted through card reader slot 145 into card reader cavity 140. Card 105 can be positioned so that contacts 110 communicatively couple with card reader contacts within card reader cavity 140 to enable electronic communications between system 130 and card 105 to perform a transaction. System 130 also includes liquid crystal display (LCD) 150 that presents transaction information to a user. System 130 can be a handheld device that can also include smartphone functions including but not limited to a touchscreen, a speaker, a microphone, a camera, and wireless communications managed via various controls (e.g., buttons, touchscreen selectable items.)

FIG. 1C illustrates example system 160 of a liquid impervious smart card reader, according to an exemplary embodiment of the disclosure. System 160 can be system 130 with a different card reader slot position. System 160 also includes housing structure 135 and LCD 150. Card reader slot 165 is similar to card reader slot 145 rotated 90 degrees. System 160 also includes card reader cavity 170. Card 105 can be inserted through card reader slot 165 into card reader cavity 170, and positioned to communicatively couple with card reader contacts within card reader cavity 170 to enable electronic communications between system 160 and card 105 to perform a transaction. System 160 can be a handheld device that can also include smartphone functions including but not limited to a touchscreen, a speaker, a microphone, a camera, and wireless communications managed via various controls (e.g., buttons, touchscreen selectable items.) In some embodiments, a card reader slot may be included on any side of system 130 or system 160.

Figure 2:
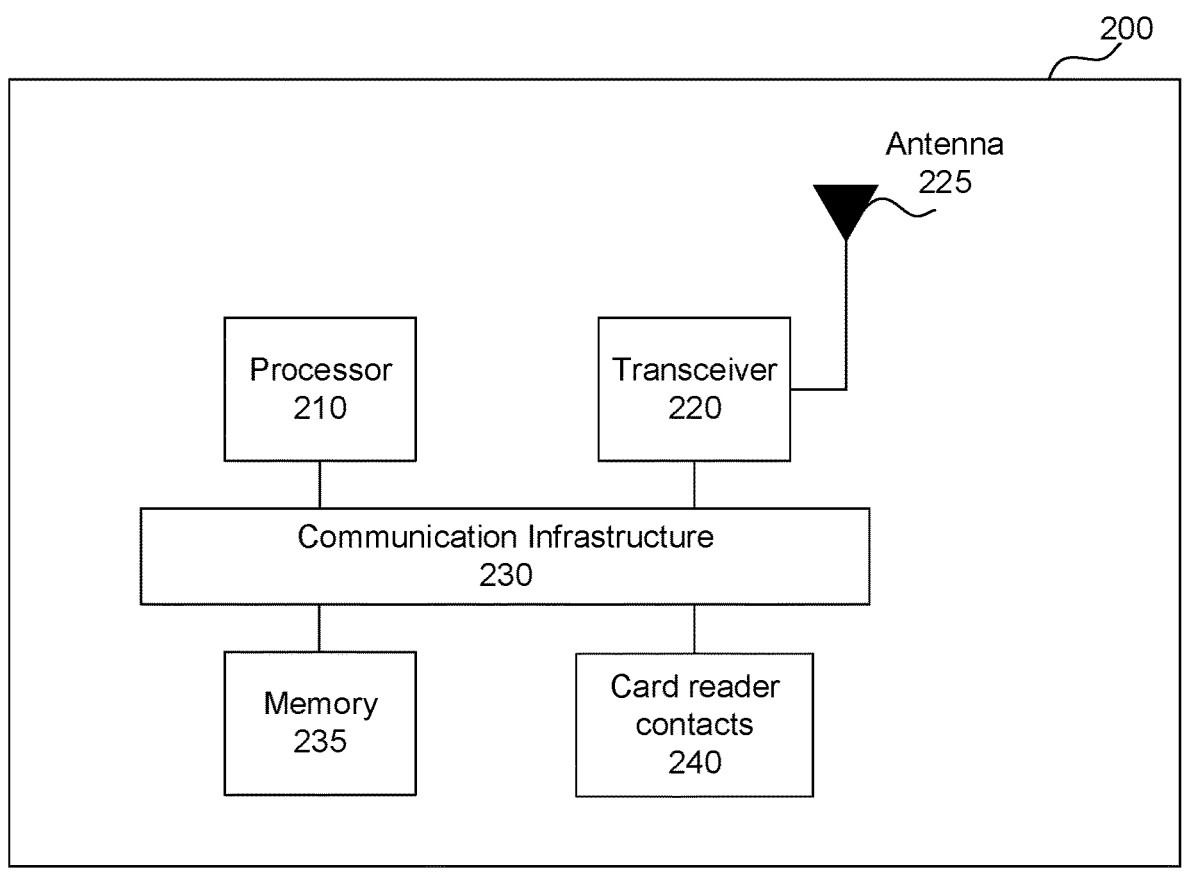
FIG. 2 illustrates a block diagram of an example wireless system of a liquid impervious smart card reader, according to some embodiments of the disclosure.

FIG. 2 illustrates a block diagram of an example wireless system 200 of a liquid impervious smart card reader, according to some embodiments of the disclosure. As a convenience and not a limitation, system 200, may be described with elements of other figures in the disclosure such FIGS. 1A, 1B, and 1C. System 200 can represent for example, a liquid impervious smart card reader as described in this disclosure, and at least in systems 130, 160, 300, 330, 350, 500, 530, 560, 600, 630, 800, 900, 930, 1000, 1030, 1100, 1130, 1200, 1230, 1300, 1400, 1450, 1470, 1490, 1500, 1560 described herein. System 200 can be a computing electronic device that enables transactions via electronic communications with card 105. System 200 can include functions of a smart phone, cellular phone, and may include functions of other computing devices including but not limited to laptops, desktops, tablets, personal assistants, routers, monitors, televisions, printers, and appliances. System 200 may include processor 210, transceiver 220, antenna 225, communication infrastructure 230, memory 235, and card reader contacts 240 that together perform operations of a liquid impervious smart card reader. For example, when card 105 is inserted into system 130 of FIG. 1B (which is an example of system 200), contacts 110 can be coupled to card reader contacts 240 of system 130 (e.g., system 200.) Processor 210 communicatively coupled to card reader contacts 240 via communication infrastructure 230, enables electronic communications between system 130 and card 105 to perform a transaction. Transceiver 220 transmits and receives wireless communications signals via antenna 225. Communication infrastructure 230 may be a bus. Memory 235 may include random access memory (RAM) and/or cache, and may include control logic (e.g., computer software), computer instructions, and/or data. Processor 210, upon execution of the computer instructions, can be configured to perform the functionality described herein for a liquid impervious smart card reader. In some embodiments, processor 210 can include its own internal memory (not shown), and/or be "hard-wired" (as in a state-machine) configured to enable liquid impervious smart card reader operations described herein. Antenna 225 coupled to transceiver 220, may include one or more antennas that may be the same or different types to enable wireless communication over a wireless network.

Figure 3A:
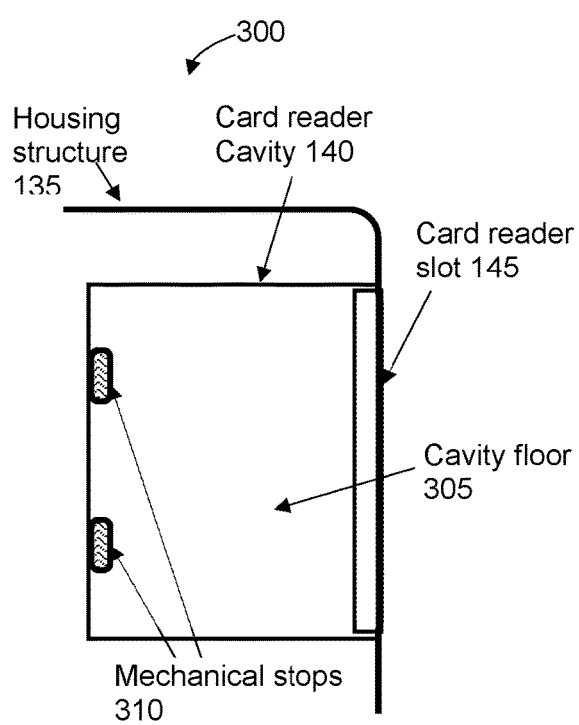
FIG. 3A illustrates a cross-section view of an example system of a liquid impervious smart card reader, according to an exemplary embodiment of the disclosure.

FIG. 3A illustrates a cross-section view in system 300 of a liquid impervious smart card reader, according to an exemplary embodiment of the disclosure. As a convenience and not a limitation, FIGS. 3A, 3B, and 3C may be described with elements of other figures in the disclosure. For example, system 300 can be a cross-section planar view of system 130, where the top portion of system 130 has been removed to reveal mechanical stops 310 within card reader cavity 140, and cavity floor 305. Mechanical stops 310 determine how far a smart card (e.g., card 105) can be inserted into card reader cavity 140.

Figure 3B:
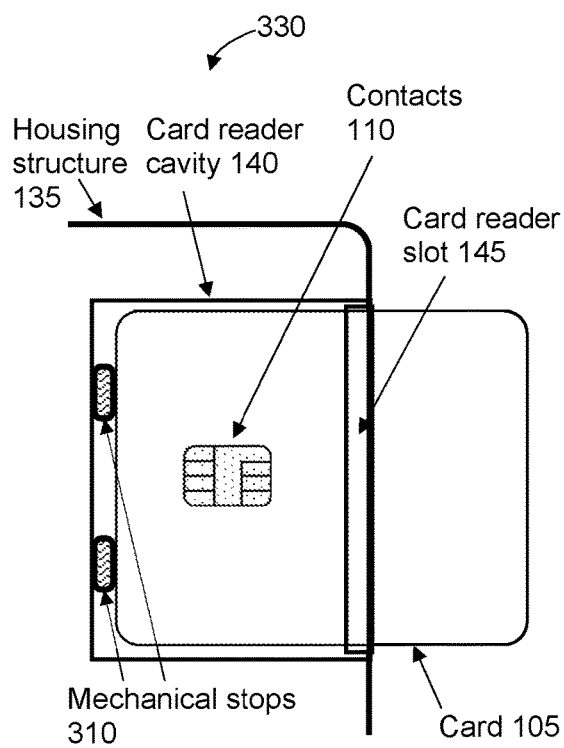
FIG. 3B illustrates cross-section details of an example system of a liquid impervious smart card reader with a smart card inserted, according to an exemplary embodiment of the disclosure.
Figure 3C:
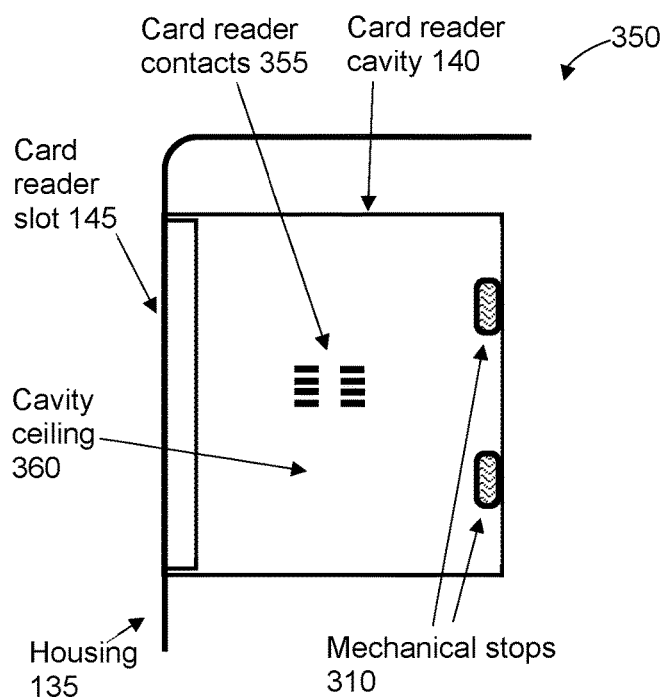
FIG. 3C illustrates an inverted cross-section view of an example system of a liquid impervious smart card reader, according to an exemplary embodiment of the disclosure.

FIG. 3B illustrates cross-section details in system 330 of a liquid impervious smart card reader with a smart card inserted, according to an exemplary embodiment of the disclosure. System 330 can be, for example, system 300 with card 105 inserted through card reader slot 145 into card reader cavity 140. Card 105 can be inserted to touch mechanical stops 310 and contacts 110 of card 105 can be communicatively coupled to card reader contacts 355 as shown in FIG. 3C. Once contacts 110 of card 105 are communicatively coupled to card reader contacts 355, system 330 enables electronic communications between system 330 and card 105 to perform a transaction.

FIG. 3C illustrates an inverted cross-section view in system 350 of a liquid impervious smart card reader, according to an exemplary embodiment of the disclosure. System 350 can be, for example, an inverted cross-section planar view of system 130 where the bottom portion of system 130 has been removed to reveal mechanical stops 310 and card reader contacts 355 located on cavity ceiling 360 of card reader cavity 140 inverted. Throughout the disclosure, cavity ceiling refers to the portion of a card reader cavity that makes contact with a smart card (e.g., cavity ceiling 360 of card reader cavity 140 includes card reader contacts 355.) For example, there is no requirement that cavity ceiling 360 be gravity up.

FIG. 17C illustrates system 1770 of a smart card reader. System 1770 provides a seal at the entrance to a card reader cavity that includes cavity ceiling 1720 and cavity floor 1730. The seal includes upper wiper blade 1710 and lower wiper blade 1715 that minimize water entering the card reader cavity.

FIG. 17A illustrates a cross-section view in system 1700 of a smart card reader. System 1700 can be a cross-section view be taken from A of system 1770 of FIG. 17C. System 1700 illustrates upper wiper blade 1710, lower wiper blade 1715, cavity ceiling 1720, cavity floor 1730, and card reader slot frame 1705a and 1705b. When no card is inserted, upper wiper blade 1710 extending from an upper portion of card reader slot frame 1705a meets lower wiper blade 1715 extending from a lower portion of card reader slot frame 1705b. By covering the card slot entrance, upper and lower wiper blades 1710 and 1715 aim to prevent water from entering the card reader cavity. A disadvantage of this approach is that upper wiper blade 1710 and lower wiper blade 1715 do not necessarily provide a completely water tight seal and any water that does enter into the card reader cavity tends to be trapped and unable to exit.

FIG. 17B illustrates friction forces on a cross-section view in system 1740 of a smart card reader. When card 105 is inserted, both upper and lower wiper blades 1710 and 1715 bend, providing a gap through which card 105 enters the card reader cavity. A disadvantage of this approach is insertion force 1760 supplied by a user to insert card 105 to bend upper and lower wiper blades 1710 and 1715, and to overcome friction forces 1750 and 1755 in the opposite direction created by the contact of card 105 with upper wiper blade 1710 and lower wiper blade 1715, to prevent water from entering the card reader cavity. Some embodiments provide a seal solution for a liquid impervious smart card reader with reduced insertion force as well as reduced friction forces compared to systems 1700, 1740, and 1770. For example, some embodiments utilize a roller system to seal the slot entrance. Some embodiments include a liquid impervious smart card reader with a liquid impervious card reader cavity.

Figure 4A:
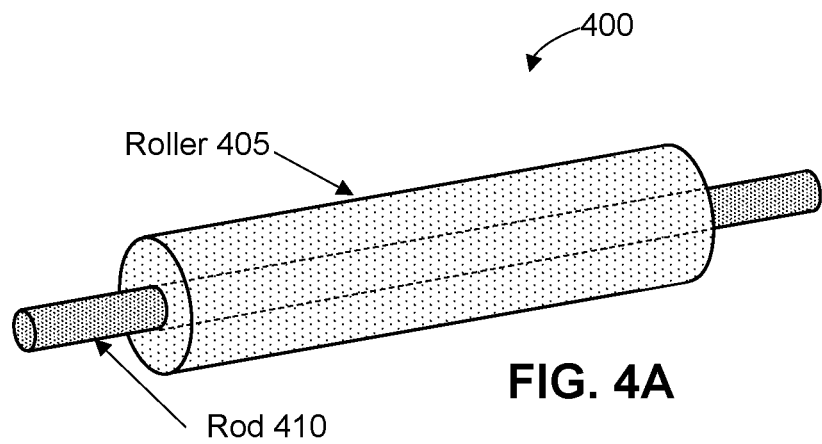
FIGS. 4A-4C illustrate views of a roller and rod of a liquid impervious smart card reader, according to an exemplary embodiment of the disclosure.
Figure 4B:
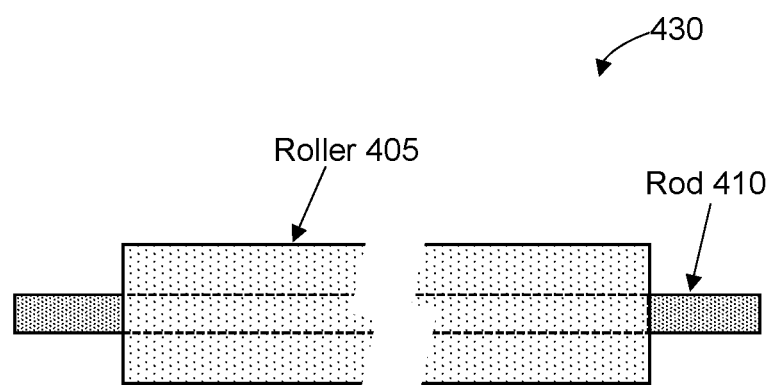
Figure 4C:
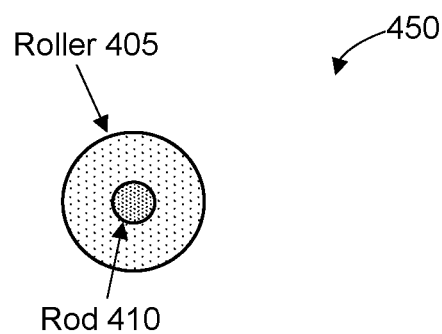

FIGS. 4A-4C illustrate views of a roller and rod of a liquid impervious smart card reader, according to an exemplary embodiment of the disclosure. As a convenience and not a limitation, FIGS. 4A, 4B, and 4C may be described with elements of other figures in the disclosure. For example, view 400 illustrates an isometric view of roller 405 supported by rod 410, where roller 405 (and rod 410) may be included in systems 500, 530, and 560 of FIGS. 5A-5C. Rod 410 includes a stiff material and can include but is not limited to a metal or a plastic. Roller 405 can include a conformable material including but not limited to rubber, foam, silicon, or an elastomer. View 430 includes a side view of roller 405 and rod 410, and view 450 shows an end view in which an end of rod 410 is concentric to roller 405.

FIG. 5C illustrates system 560 of a liquid impervious smart card reader, according to an exemplary embodiment of the disclosure. As a convenience and not a limitation, FIGS. 5A, 5B, and 5C may be described with elements of other figures in the disclosure. For example, system 560 can be a 3-dimensional view of system 300. Some dimensions may be exaggerated for illustration purposes. System 560 can include housing structure 135 and a card reader cavity that includes cavity ceiling 360 that includes card reader contacts 355 (not shown), cavity floor 305, bottom structure 520, and side structure 510. In addition, system 560 can include roller 405 that seals the entrance to the card reader cavity when a smart card is not inserted.

FIG. 5A illustrates rod 410 in a home position in system 500 of a liquid impervious smart card reader with a sealed slot, according to an exemplary embodiment of the disclosure. System 500 can be a cross-section view of system 560 taken at B. When a card is not inserted, roller 405 seals card reader slot 515 by making conformable contact with side structure 510 at side seal portion 503 above card reader slot 515 as well as with bottom structure 520 below card reader slot 515 at bottom seal portion 505. When rod 410 is in this position, which may be referred to as the "home" position, the roller 405 seals card reader slot 515, and prevents liquid exterior to housing structure 135 from entering card reader cavity 140. When card 105 is inserted, rod 410 (and hence roller 405) moves in retraction direction 525 indicated by the dotted arrow. A seal to card reader slot 515 is not provided while card 105 (or any card) is inserted into card reader slot 515. FIG. 5B illustrates rod 410 in a retracted position in system 530 of a liquid impervious smart card reader with a smart card (e.g., card 105) inserted, according to an exemplary embodiment of the disclosure. System 530 can be system 500 with card 105 inserted. System 530 illustrates the motion of rod 410 from rod home location 535 to a retracted position when card 105 is inserted into card reader slot 515 in card insertion direction 540. The motion is represented as displacement vector 545.

Figure 6A:
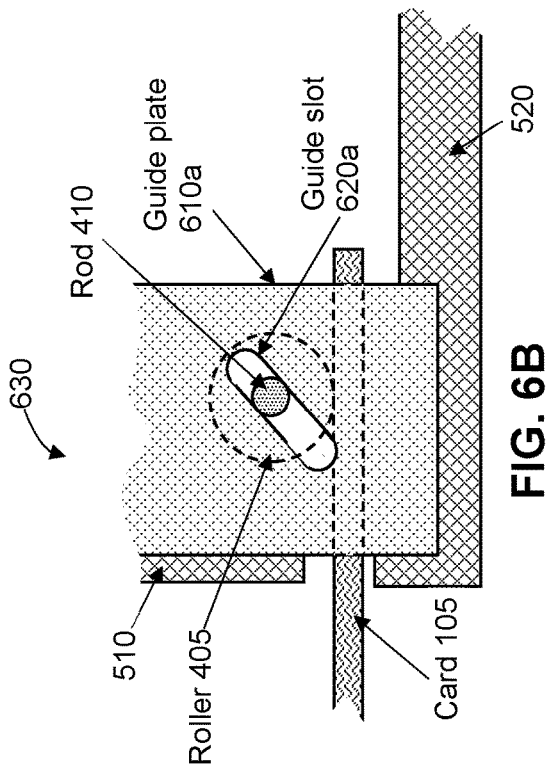
FIG. 6A illustrates a rod in a guide slot of an example system of a liquid impervious smart card reader with a sealed slot, according to an exemplary embodiment of the disclosure.
Figure 6B:
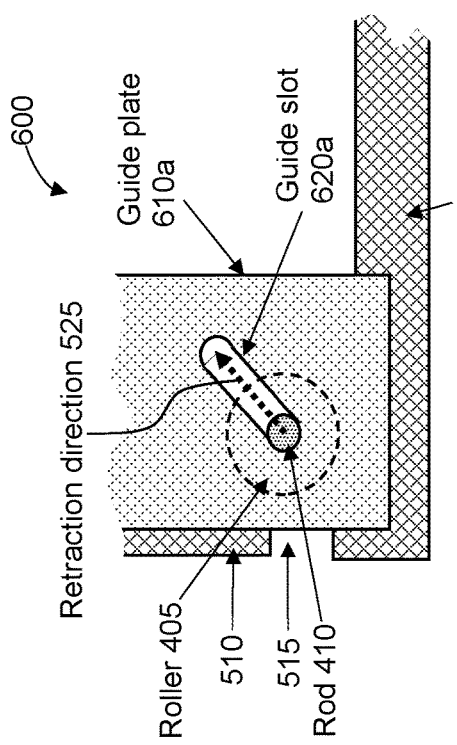
FIG. 6B illustrates a rod in a guide slot of an example system of a liquid impervious smart card reader with a smart card inserted, according to an exemplary embodiment of the disclosure.

FIG. 6A illustrates rod 410 in guide slot 620a in system 600 of a liquid impervious smart card reader with a sealed slot, according to an exemplary embodiment of the disclosure. As a convenience and not a limitation, FIGS. 6A and 6B may be described with elements of other figures in the disclosure. For example, system 600 can by system 500 of FIG. 5A with guide plate 610a. System 600 includes parallel guide plates 610a and 610b and corresponding guide slots 620a and 620b at each end of rod 410, although only guide plate 610a and guide slot 620a are shown in this view. In system 600, rod 410 is in rod home location 535. When a card is inserted into card reader slot 515, rod 410 (and roller 405) move in retraction direction 525 constrained by guide slot 620a. FIG. 6B illustrates rod 410 in guide slot 620a in system 630 of a liquid impervious smart card reader with a smart card (e.g., card 105) inserted, according to an exemplary embodiment of the disclosure. For example, system 630 can be system 600 where card 105 is inserted into card reader slot 515 and rod 410 moves from rod home location 535 in retraction direction 525 according to guide slot 620a.

Figure 7B:
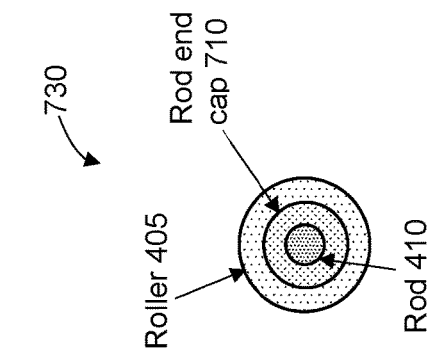
FIG. 7B illustrates a rod and roller end view of an example system of a liquid impervious smart card reader, according to an exemplary embodiment of the disclosure.
Figure 7A:
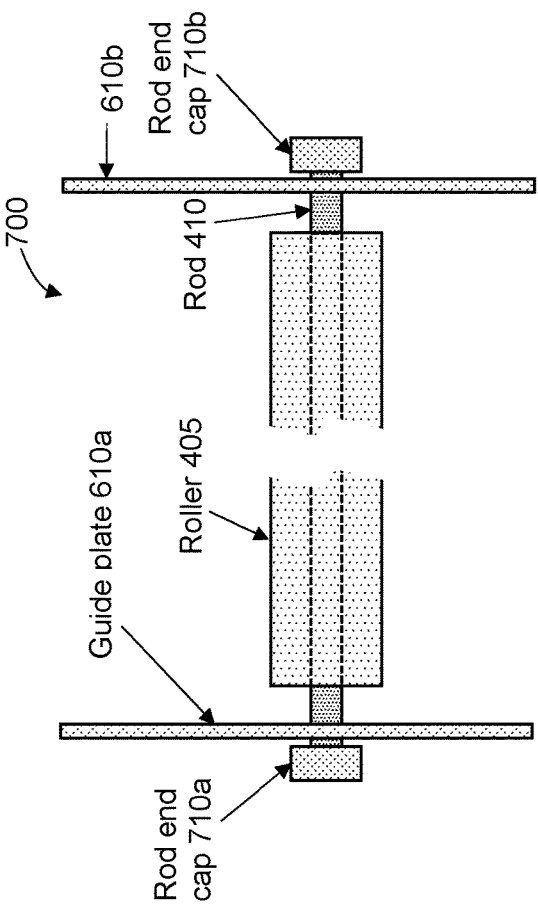
FIG. 7A illustrates guide plates of an example system of a liquid impervious smart card reader, according to an exemplary embodiment of the disclosure.

FIG. 7A illustrates guide plates 610a and 610b in system 700 of a liquid impervious smart card reader, according to an exemplary embodiment of the disclosure. As a convenience and not a limitation, FIGS. 7A and 7B may be described with elements of other figures in the disclosure. For example, system 700 can be another view of system 600 of FIG. 6A. System 700 includes rod 410 and roller 405 positioned in respective guide slots 620a and 620b (not shown), where the ends of rod 410 extend beyond guide plates 610a and 610b. Rod end caps 710a and 710b are affixed to corresponding ends of rod 410 that protrude beyond respective guide plates 610a and 610b. Rod end caps 710a and 710b keep roller 405 and rod 410 between (e.g., centered between) guide plates 610a and 610b. For illustration purposes the spacings may be exaggerated and are not limiting. FIG. 7B illustrates rod 410 and roller 405 end view 730 of a liquid impervious smart card reader, according to an exemplary embodiment of the disclosure. View 730 can be similar to view 450 of FIG. 4C, but with the inclusion of rod end cap 710 whose diameter is larger than that of rod 410 and larger than a width of a corresponding guide slot 620a or 620b.

FIG. 8 illustrates retraction angle, $\theta$, 810 in system 800 of a liquid impervious smart card reader with a smart card inserted, according to an exemplary embodiment of the disclosure. As a convenience and not a limitation, FIG. 8 may be described with elements of other figures in the disclosure. For example, system 800 can be system 630 of FIG. 6B with an illustration of retraction angle, $\theta$, 810, that is the angle between retraction direction 525 and card insertion direction 540. As described below, the angle $\theta$ is chosen not to be close to 0° or 90°.

In some embodiments a guide slot can be curved rather than straight. In this example, the retraction direction may be defined by the tangent at the home position of the guide slot constrained motion.

Figures 9A, 9B:
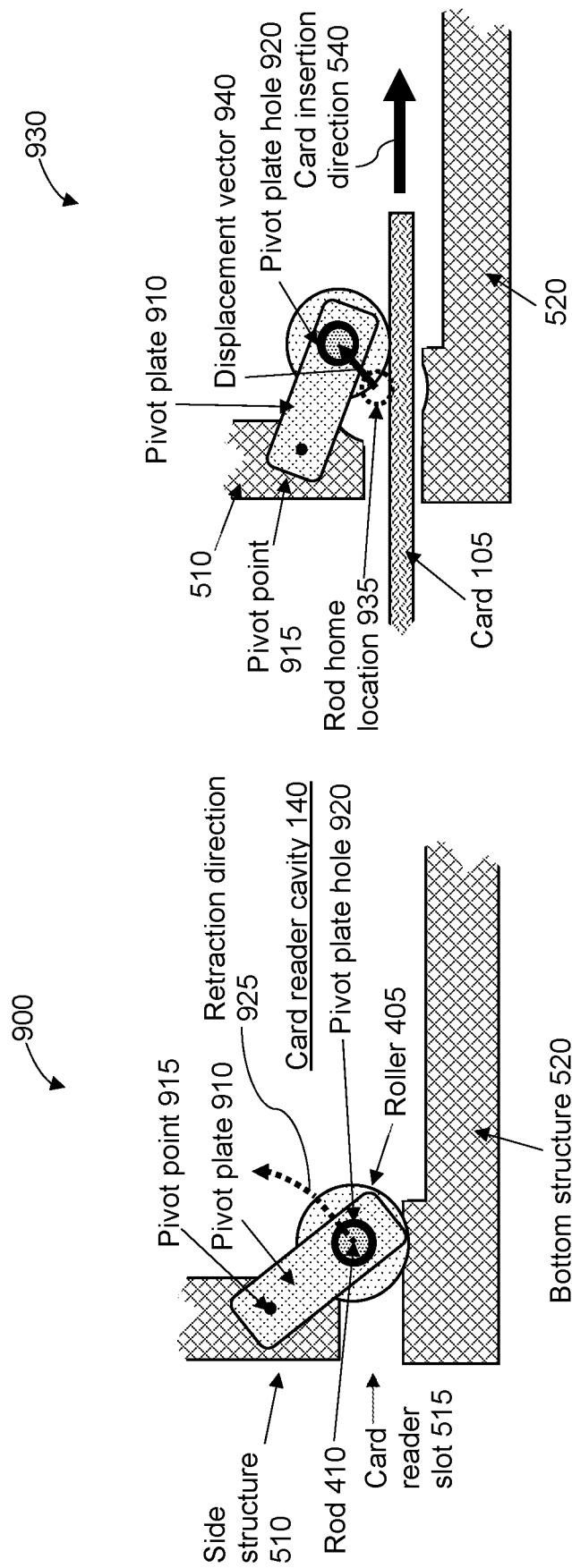
FIG. 9A illustrates a pivot plate in a home position of an example system of a liquid impervious smart card reader with a sealed slot, according to an exemplary embodiment of the disclosure.
FIG. 9B illustrates a pivot plate in a retracted position of an example system of a liquid impervious smart card reader with a smart card inserted, according to an exemplary embodiment of the disclosure.

FIG. 9A illustrates pivot plate 910 in a home position in system 900 of a liquid impervious smart card reader with a sealed slot, according to an exemplary embodiment of the disclosure. As a convenience and not a limitation, FIGS. 9A and 9B may be described with elements from other figures in the disclosure. For example, system 900 can be system 300 of FIG. 3A with a pivot mechanism rather than with guide plates and guide slots. For example, system 900, can include a pivot mechanism that includes pivot plate 910 that is coupled to side structure 510 at pivot point 915. Rod 410 can be affixed to pivot plate 910 at pivot plate hole 920. When rod 410 is in the home position, roller 405 seals card reader slot 515 by making contact with side structure 510 and bottom structure 520. A curved or arced retraction path 925 may also be achieved with the pivot mechanism rather than guide slots 620a and 620b and guide plates 610a and 610b. While pivot plate 910 is shown, there can be another pivot plate in parallel (not shown) where the ends of rod 410 are captured in pivot plate hole 920 (and another pivot plate hole in the parallel pivot plate not shown.) FIG. 9B illustrates pivot plate 910 in a retracted position in system 930 of a liquid impervious smart card reader with a smart card inserted, according to an exemplary embodiment of the disclosure. System 930 can be system 900 with card 105 being inserted into card reader slot 515. System 930 illustrates displacement vector 940 indicating the motion of rod 410 away from rod home location 935 to a retracted position.

Figure 10B:
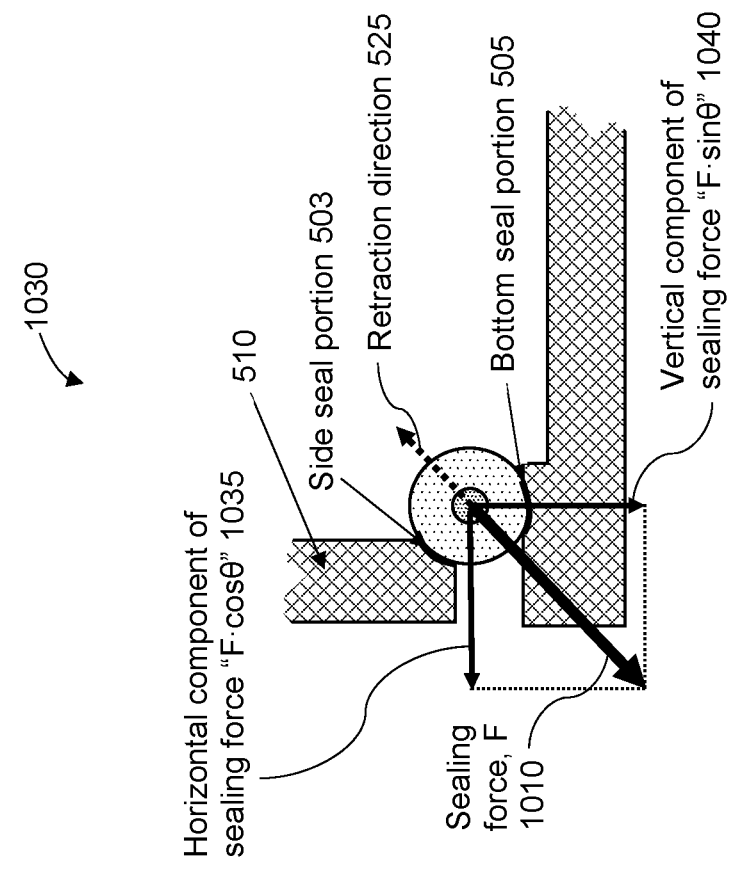
FIG. 10B illustrates sealing force components of an example system of a liquid impervious smart card reader with a sealed slot, according to an exemplary embodiment of the disclosure.
Figure 10A:
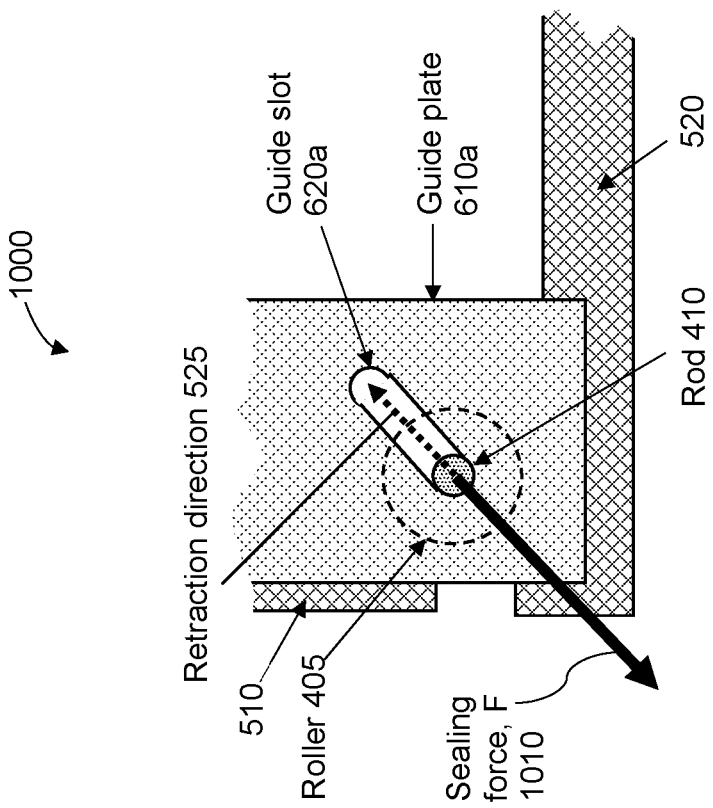
FIG. 10A illustrates a sealing force of an example system of a liquid impervious smart card reader with a sealed slot, according to an exemplary embodiment of the disclosure.

FIG. 10A illustrates sealing force, F, 1010 in system 1000 of a liquid impervious smart card reader with a sealed slot, according to an exemplary embodiment of the disclosure. As a convenience and not a limitation, FIGS. 10A and 10B may be described with elements of other figures in the disclosure. For example, system 1000 can be system 600 of FIG. 6A. System 1000 illustrates sealing force, F, 1010 applied to rod 410 to compress roller 405 against side structure 510 and bottom structure 520 so as to provide a liquid-tight seal to prevent liquid from entering card reader cavity 140. The component of sealing force, F, 1010 parallel to guide slot 620a contributes to roller 405 seal compression. Other forces perpendicular to guide slot 620a result in forces between rod 410 and guide plate 610a, but do not contribute to motion of rod 410 (and roller 405.) Accordingly, sealing force, F, 1010 contributing to the liquid-tight seal of card reader slot is parallel to the guide slot 620a in direction (e.g., at a downward angle, $\theta$, with respect to card insertion direction 540, where $\theta$ is the retraction angle.)

FIG. 10B illustrates sealing force components in system 1030 of a liquid impervious smart card reader with a sealed slot, according to an exemplary embodiment of the disclosure. System 1030 can be system 1000 without guide plate 610a shown. A magnitude of sealing force, F, 1010 includes horizontal component of sealing force 1035 that contributes to the liquid-tight seal between roller 405 and side structure 510. Horizontal component of sealing force 1035 is equal to F·cos $\theta$. Vertical component of sealing force 1040 contributing to the liquid-tight seal between roller 405 and bottom structure 520 is equal to F·sin $\theta$. As retraction angle, $\theta$, 810 approaches 0°, vertical component of sealing force 1040 (e.g., F·sin $\theta$) approaches zero and a poor seal is provided between roller 405 and bottom structure 520. As retraction angle, $\theta$, 810 approaches 90°, horizontal component of sealing force F·cos $\theta$ approaches zero and a poor seal is provided between roller 405 and side structure 510. A more desirable retraction angle, $\theta$, 810 is 45° which balances the horizontal and vertical components of seal force, 1035 and 1040, with the value of) F·sin(45°)=F·cos(45°=0.707·F. By approximately balancing the horizontal and downward force components, a liquid-tight seal is provided between roller 405 and both side structure 510 and bottom structure 520.

Figures 11A, 11B:
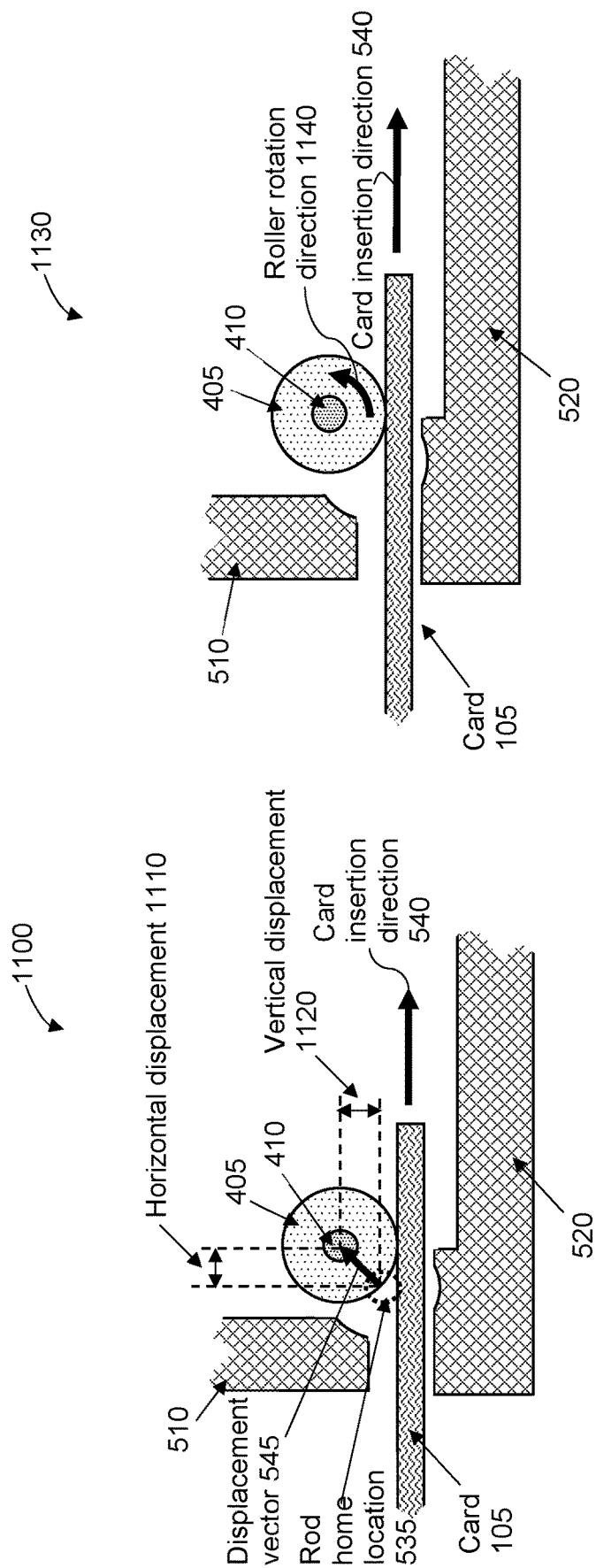
FIG. 11A illustrates displacement vector components of an example system of a liquid impervious smart card reader with a smart card inserted, according to an exemplary embodiment of the disclosure.
FIG. 11B illustrates a roller rotation of an example system of a liquid impervious smart card reader as a smart card is inserted, according to an exemplary embodiment of the disclosure.

FIG. 11A illustrates displacement vector components in system 1100 of a liquid impervious smart card reader with a smart card inserted, according to an exemplary embodiment of the disclosure. As a convenience and not a limitation, FIGS. 11A and 11B may be described with elements from other figures in the disclosure. For example, system 1100 may be system 530 of FIG. 5B, showing horizontal displacement 1110 component and vertical displacement 1120 component. In addition to the desire to approximately equalize the two sealing force components (e.g., horizontal component of sealing force 1035 and vertical component of sealing force 1040), the overall mechanical compactness of the industrial design of the handheld liquid impervious smart card reader device is another consideration. In a retracted position, roller 405 and rod 410 move both vertically and horizontally. The thickness of card 105 largely determines vertical displacement 1120. The corresponding horizontal displacement 1110 is the cotangent of the retraction angle, $\theta$, 810 times vertical displacement 1120. Depending on the mechanical design constraints, it may be desirable to minimize horizontal displacement 1110. For example, in some embodiments, the optimal retraction angle, $\theta$, 810 may be larger than 45°.

If the length of displacement vector 545 is notated by D, then horizontal displacement 1110 and vertical displacement 1120 components of displacement vector 545 are D·cos $\theta$ and D·sin $\theta$, respectively. For applications where making room for the horizontal component of displacement is less desirable, a retraction angle larger than 45° may be implemented to reduce the value of horizontal displacement 1110 component, D·cos $\theta$. If, however, making room for horizontal displacement 1110 component is not a problem, a retraction angle smaller than 45° may be implemented. Depending on the application, the retraction angle, $\theta$, 810 may be in the range $20°\leq\theta\leq80°$, or more preferably $30°\leq\theta\leq60°$, or even more preferably $40°\leq\theta\leq50°$.

FIG. 11B illustrates roller rotation in system 1130 of a liquid impervious smart card reader as a smart card is inserted, according to an exemplary embodiment of the disclosure. System 1130 may be system 1100 illustrating a rotation of roller 405. To minimize card insertion force (e.g., compared to system 1740 of FIG. 17B), roller 405 moves according to roller rotation direction 1140 as card 105 is being inserted in card insertion direction 540. When card 105 is removed, roller 405 rotates in the opposite direction. While roller 405 could rotate about rod 410, in some embodiments, roller 405 and rod 410 operate as a single unit, according to the conformable material making contact with card 105. Having roller 405 and rod 410 rotate as a single unit can be more cost effective than having roller 405 and rod 410 rotate as separate units. If rod 410 and roller 405 are a single unit and rod 410 also rotates, it is desirable to avoid undue resistance to rotation due to friction between rod 410 and the guide slots 620a and 620b. In some embodiments, either a surface of rod 410, or a surface of guide slots 620a or 620b, or both may be treated to reduce friction. For example, a sleeve of a fluorinated polymer (such as Teflon™) may be added to rod 410 at points of contact with corresponding guide slots 620a and 620b.

Note that a retraction angle, θ, 810 of approximately 45° assures that as card 105 is inserted roller 405 promptly loses contact with both side structure 510 and bottom structure 520, so that friction against these surfaces do not impede rotation. This is in contrast to system 1740 of FIG. 17B, for example. This reinforces the choice of retraction angle ranges discussed above.

FIG. 12A illustrates a conceptual seal-force spring in system 1200 of a liquid impervious smart card reader with a sealed slot, according to an exemplary embodiment of the disclosure. As a convenience and not a limitation, FIGS. 12A and 12B may be described with elements from other figures in the disclosure. For example, system 1200 can be system 1000 of FIG. 10A utilizing a conceptual seal-force spring to apply sealing force, F, 1010 to rod 410 and roller 405 assembly. System 1200 includes spring under compression 1210 and brick wall 1220. Spring under compression 1210 pushes against rod 410 resulting in desired sealing force, F, 1010 being applied between roller 405 and side structure 510 and bottom structure 520 at side seal portion 503 and bottom seal portion 505, respectively. The other end of spring under compression 1210 must have something to push against, which, is illustrated here as brick wall 1220. The magnitude of sealing force, F, 1010 should be sufficiently large to provide a liquid-tight seal at side seal portion 503 and bottom seal portion 505, yet at the same time, avoid an unnecessary increase in the card insertion force. For example, sealing force, F, 1010 should not be unnecessarily large.

FIG. 12B illustrates a seal-force spring in system 1230 of a liquid impervious smart card reader with a sealed slot, according to an exemplary embodiment of the disclosure. System 1230 can be system 1000 of FIG. 10A utilizing a seal-force spring. System 1230 includes spring lever arm 1240, spring coil 1245, and spring anchor 1250. Spring coil 1245 includes many coils and includes spring anchor 1250 coupled to the housing structure 135 (e.g., bottom structure 520.) Spring lever arm 1240 presses against rod 410.

Figure 13:
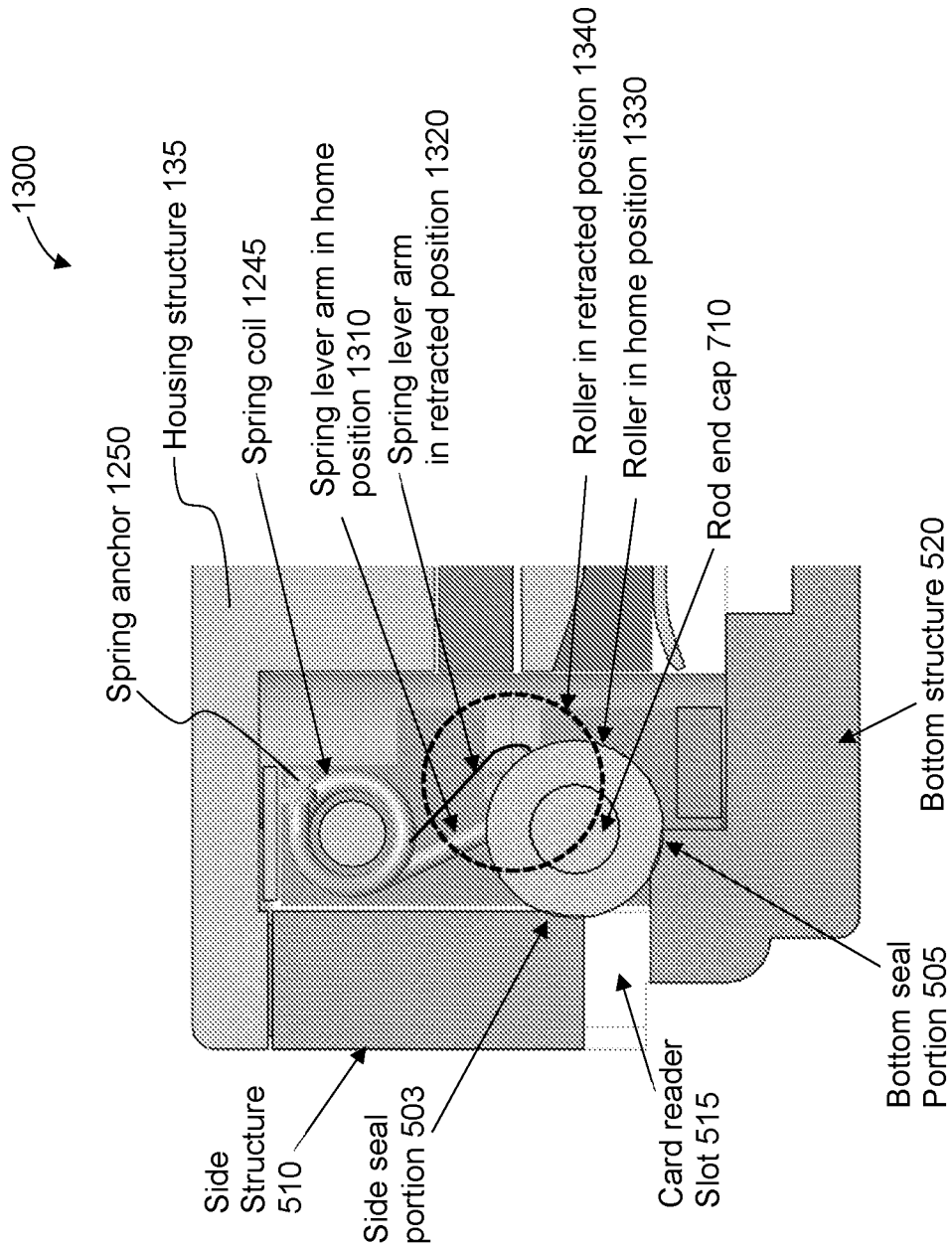
FIG. 13 illustrates a seal-force spring example system of a liquid impervious smart card reader with a sealed slot, according to an exemplary embodiment of the disclosure.

FIG. 13 illustrates a seal-force spring in system 1300 of a liquid impervious smart card reader with a sealed slot, according to an exemplary embodiment of the disclosure. As a convenience and not a limitation, FIG. 13 may be described with elements from other figures in the disclosure. For example, system 1300 can be a space-efficient implementation of systems 1200 or 1230 of FIGS. 12A and 12B, respectively. For example, spring coil 1245 may include many coils, and has spring anchor 1250 to housing structure 135. Spring lever arm in home position 1310 presses against rod 410 applying sufficient sealing force, F, 1010 to establish a liquid-tight seal for card reader slot 515. Rod end cap 710 is shown although guide plates 610a and 610b as well as guide slots 620a and 620b are not shown. Sealing force, F, 1010 enables roller in home position 1330 to make contact with side structure 510 at side seal portion 503 and bottom structure 520 at bottom seal portion 505. When card 105 is inserted in card insertion direction 540 as shown in system 1130 of FIG. 11B, roller 405 and moves to roller in retracted position 1340 corresponding with spring lever arm in retracted position 1320.

Figure 14D:
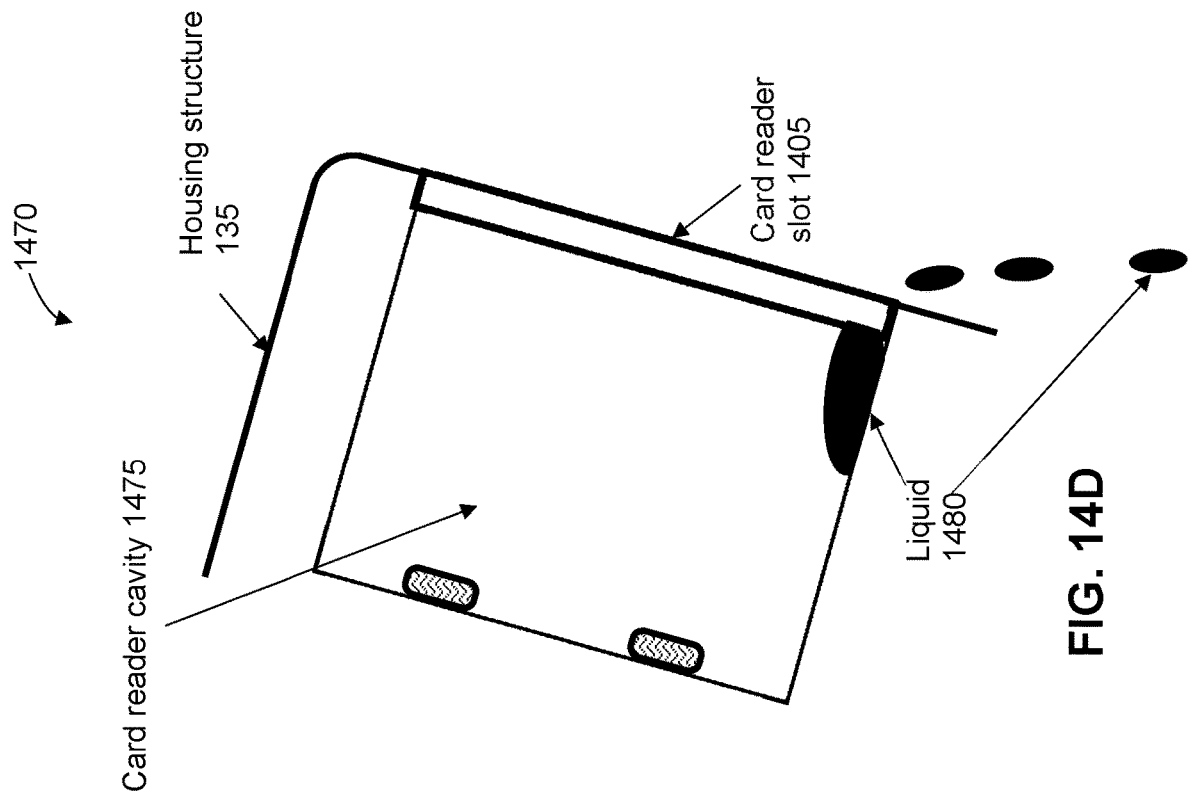
FIG. 14D illustrates removing liquid in an example system of a liquid impervious smart card reader, according to an exemplary embodiment of the disclosure.
Figure 14C:
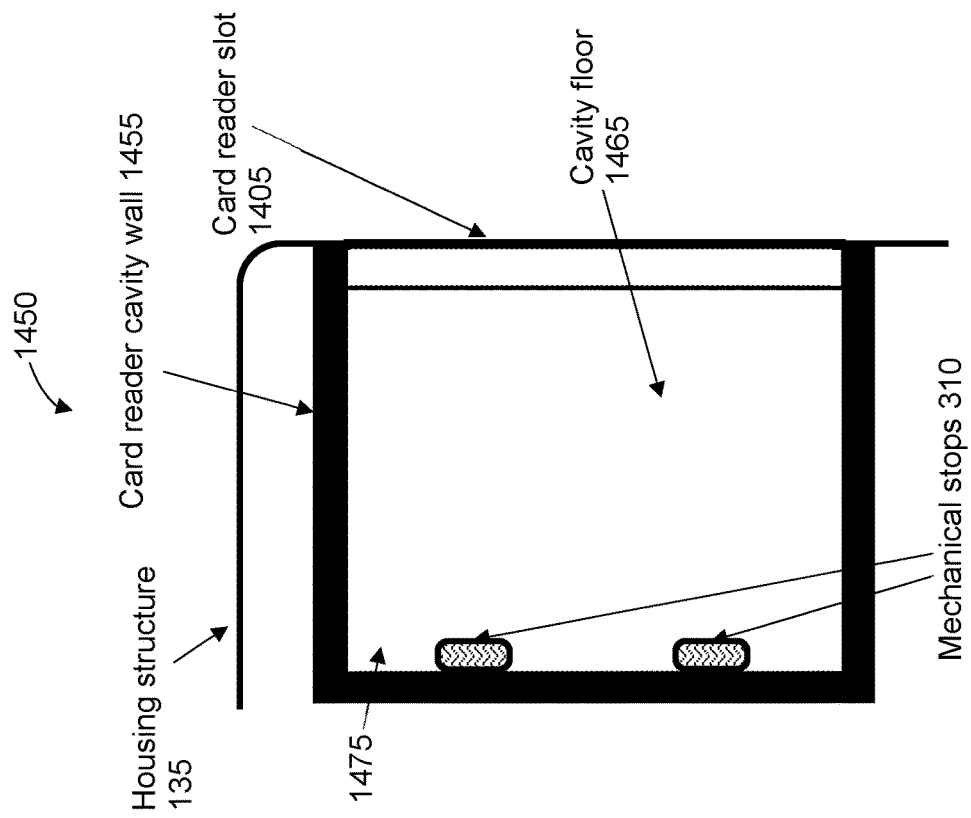
FIG. 14C illustrates another cross-section view of an example system of a liquid impervious smart card reader, according to an exemplary embodiment of the disclosure.
Figure 14E:
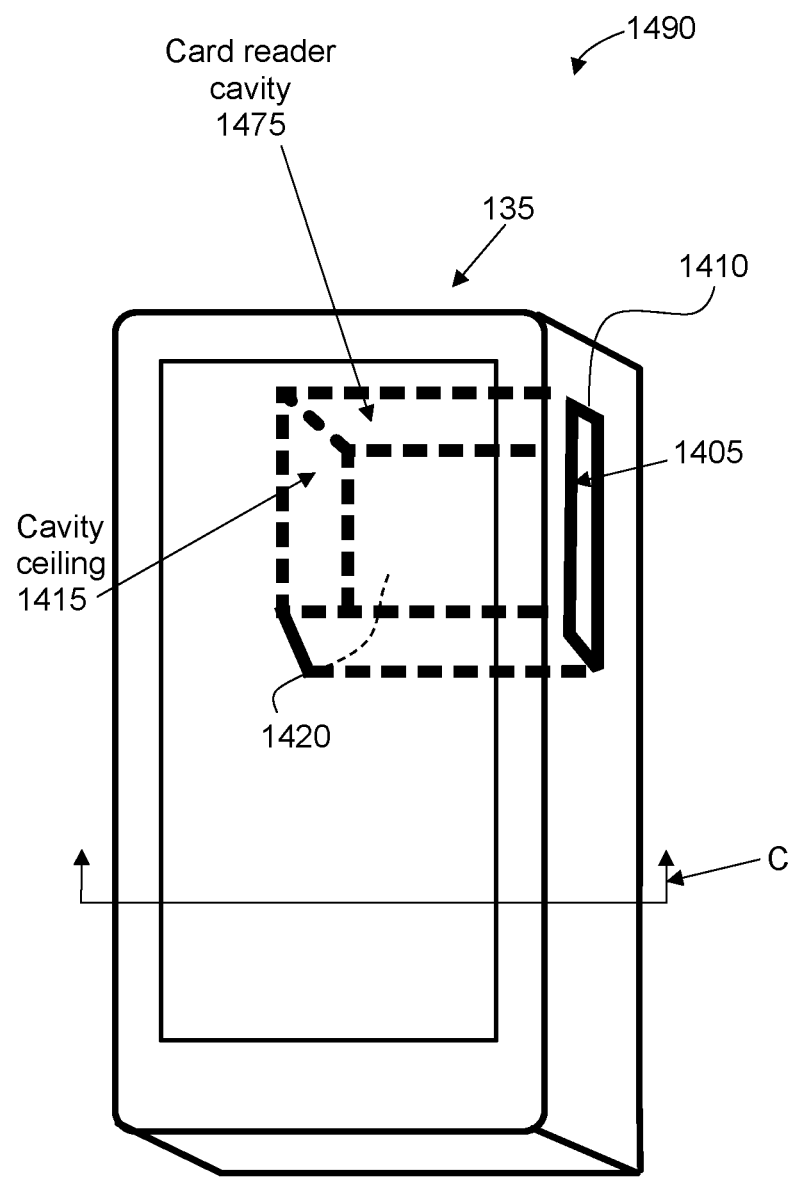
FIG. 14E illustrates another example system of a liquid impervious smart card reader, according to an exemplary embodiment of the disclosure.

FIG. 14E illustrates system 1490 of a liquid impervious smart card reader, according to an exemplary embodiment of the disclosure. As a convenience and not a limitation, FIGS. 14A, 14B, 14C, 14D, and 14E may be described with elements of other figures in the disclosure. For example, system 1490 can be system 300 of FIG. 3B. System 1490 may include cavity floor 1420, card reader cavity wall 1455, and cavity ceiling 1415 assembled together to create card reader cavity 1475 that is sealed and impervious to liquid. Card reader cavity 1475 is sealed such that liquids cannot pass between card reader cavity 1475, and internal portions of housing structure 135. System 1490 includes card reader slot 1405. In some embodiments, system 1490 does not include a seal for card reader slot 1405, and insertion force is unnecessary. This is in contrast to system 1700 of FIG. 17A.

FIG. 14A illustrates a cross-section view in system 1400 of a liquid impervious smart card reader, according to an exemplary embodiment of the disclosure. System 1400 can be a cross-section view of system 1490 taken at C. System 1400 shows a portion of card reader cavity 1475 that includes portions of card reader slot frame 1410a and 1410b, cavity ceiling 1415, and cavity floor 1420. Card 105 is not yet inserted into card reader cavity 1475 via card reader slot 1405.

FIG. 14B illustrates minimal insertion force in a cross-section view in system 1430 of a liquid impervious smart card reader, according to an exemplary embodiment of the disclosure. System 1430 can be system 1400 with card 105 inserted into card reader slot 1405. In system 1430, card 105 is inserted into card reader cavity 1475 via card reader slot 1405 with minimal and almost no insertion force 1440 which is in stark contrast to system 1740 of FIG. 17B.

FIG. 14C illustrates a cross-section view in system 1450 of a liquid impervious smart card reader, according to an exemplary embodiment of the disclosure. For example, system 1450 can be a cross-section planar view of system 1490 that illustrates housing structure 135, card reader slot 1405, mechanical stops 310, card reader cavity wall 1455, and cavity floor 1465. Cavity floor 1465 and/or cavity ceiling 1415 may be a surface of a printed circuit board (PCB) such as an FR4 PCB. Card reader cavity wall 1455 may be bonded to cavity floor 1465 and cavity ceiling 1415 by various means including a die-cut pressure sensitive adhesive. Other bonding options include but are not limited to thermoset adhesives or an epoxy adhesive. In some embodiments, a water-impervious conformal coating may be applied to interior surfaces of card reader cavity 1475 to further assure a liquid-tight seal. Any liquid that makes it into card reader cavity 1475 cannot further enter into the interior of housing structure 135. In some embodiments, cavity floor 1465 and/or cavity ceiling 1415 can be made with and/or coated with a hydrophobic material. Card reader cavity wall 1455 may be made with and/or coated with a hydrophilic material. Thus, any liquid that enters card reader cavity 1475 will be drawn to the perimeter of card reader cavity 1475 and repelled from cavity ceiling 1415 where card reader contacts (e.g., card reader contacts 355 of FIG. 3C) are located as well as cavity floor 1465.

FIG. 14D illustrates removing liquid in system 1470 of a liquid impervious smart card reader, according to an exemplary embodiment of the disclosure. In some embodiments, system 1470 can be system 1490 where no impediments are included for card reader slot 1405. Accordingly, liquid 1480 that enters card reader cavity 1475 can be drained via card reader slot 1405 by tilting system 1470 in an appropriate direction.

FIG. 15A illustrates components in system 1500 of a liquid impervious smart card reader, according to an exemplary embodiment of the disclosure. As a convenience and not a limitation, FIGS. 15A and 15B may be described with elements of other figures in the disclosure. For example, system 1500 can be system 1490 of FIG. 14E in which ceiling floor 1465 and card reader cavity wall 1455 are formed as a single structure, secure card reader (SCR) holder 1550, that can be liquid impervious. System 1500 includes SCR holder 1550, cavity ceiling 1515, card reader contacts 1520, pressure sensitive adhesive (PSA) 1530, card reader slot frame 1410, and elastomer gasket 1525. SCR holder 1550 can be molded as a single structure and can be made of plastic including but not limited to acrylonitrile butadiene styrene (ABS.) Cavity ceiling 1515 may be a PCB such as FR4 PCB and may include card reader contacts 1520 that includes SCR spring contact connectors that can communicatively couple with contacts 110 of card 105. Cavity ceiling 1515 can be sealed to SCR holder 1550 by PSA 1530 that can include but is not limited to a die-cut pressure sensitive adhesive, a thermoset adhesive, and/or an epoxy adhesive. Card reader slot frame 1410 creates card reader slot 1540 through which card 105 may be inserted. Elastomer gasket 1525 provides sealing functions between SCR holder 1550 and an inner wall of system 1490. Thus, if any liquids enter the card reader cavity formed by the assembly of cavity ceiling 1515, SCR holder 1550, and PSA 1530, elastomer gasket 1525 prevents that liquid from entering remaining interior portions of housing structure 135. In some embodiments, portions of SCR holder 1550 and/or cavity ceiling 1415 can be made with and/or coated with a hydrophobic material. Portions of SCR holder 1550 equivalent to card reader cavity wall 1455 may be made with and/or coated with a hydrophilic material. Thus, any liquid that enters card reader cavity formed by the assembly of components in system 1500 will be drawn to the perimeter of the card reader cavity and repelled from cavity ceiling 1515 where card reader contacts 1520 are located as well as portions of SCR holder 1550 equivalent to cavity floor 1465. In some embodiments, a water-impervious conformal coating may be applied to interior surfaces of a card reader cavity formed by the assembly of cavity ceiling 1515, SCR holder 1550, and PSA 1530, and elastomer gasket 1525, to further assure a liquid-tight seal.

FIG. 15B illustrates an inverted view of assembled components in system 1560 of a liquid impervious smart card reader, according to an exemplary embodiment of the disclosure. System 1560 includes inverted views of the following components of system 1500: SCR holder 1550, cavity ceiling 1515 (that includes card reader contacts 1520). System 1560 also includes views of card reader slot frame 1410 and elastomer gasket 1525.

In some examples a liquid impervious smart card reader may include SCR holder 1550 of system 1500 and rod 410 (and roller 405) of system 560 and other examples as described above. Accordingly, some embodiments include system 1500 in combination with system 560. In some examples, a liquid impervious smart card reader may include card reader cavity 1475 that includes cavity floor 1420, card reader cavity wall 1455, and cavity ceiling 1415 assembled together to create card reader cavity 1475 that is sealed and impervious to liquid as described in system 1490 as well as rod 410 and roller 405 of system 560 and other examples as described above. Accordingly, some embodiments include system 1490 in combination with system 1500.

Figure 16:
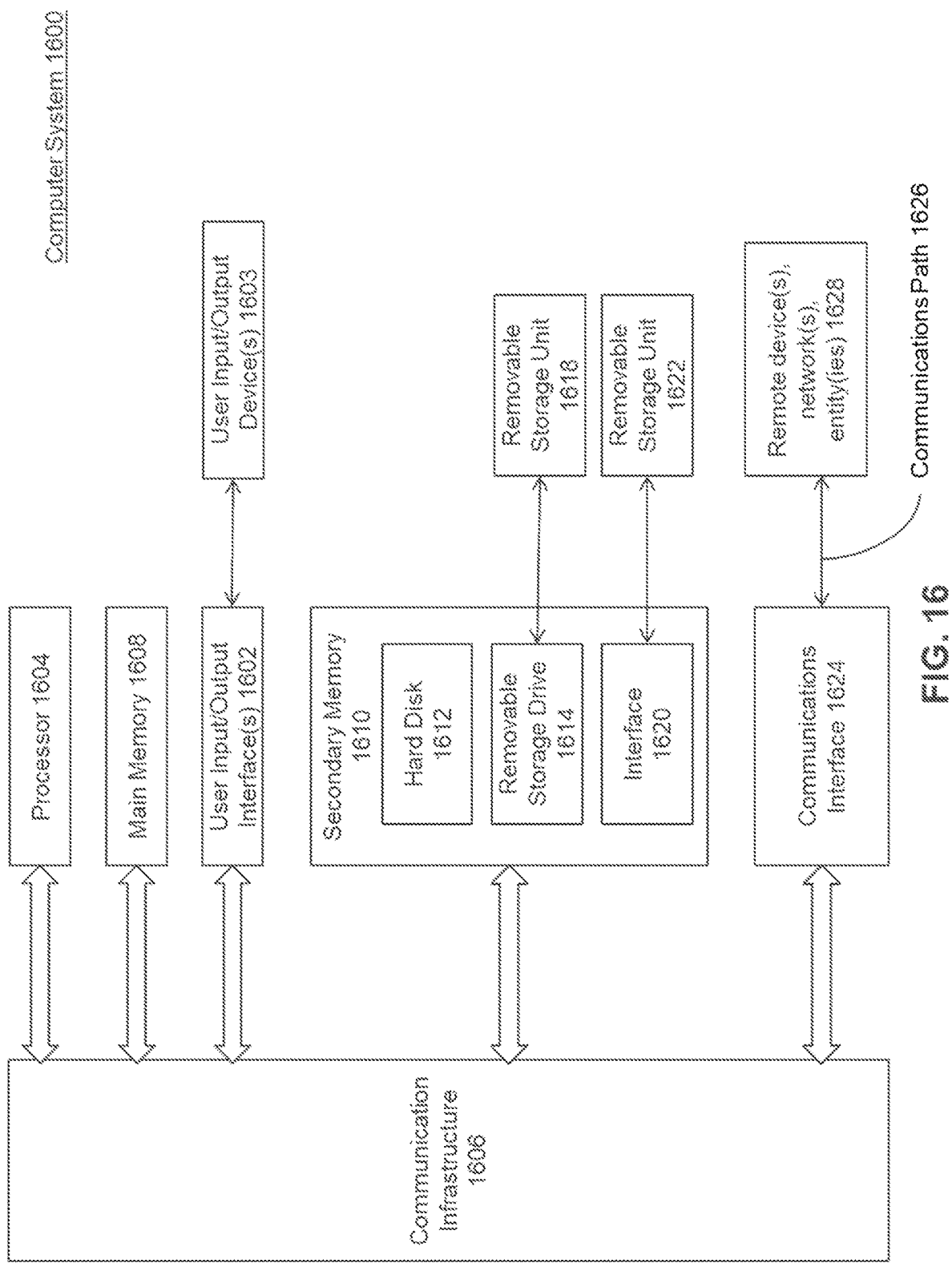
FIG. 16 illustrates an example computer system for implementing some embodiments or portion(s) thereof.

Various embodiments can be implemented, for example, using one or more well-known computer systems, such as computer system 1600 shown in FIG. 16. Computer system 1600 can be any well-known computer capable of performing the functions described herein for a liquid impervious smart card reader as described above and at least in systems 130, 160, 300, 330, 350, 500, 530, 560, 600, 630, 800, 900, 930, 1000, 1030, 1100, 1130, 1200, 1230, 1300, 1400, 1450, 1470, 1490, 1500, 1560 described above.

Computer system 1600 includes one or more processors (also called central processing units, or CPUs), such as a processor 1604. Processor 1604 is connected to communication infrastructure 1606 (e.g., a bus). One or more processors 1604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 1600 also includes user input/output device(s) such as monitors, keyboards, pointing devices, etc., that communicate with communication infrastructure 1606 through user input/output interface(s) 1602.

Computer system 1600 also includes a main or primary memory 1608, such as random access memory (RAM). Main memory 1608 may include one or more levels of cache. Main memory 1608 has stored therein control logic (i.e., computer software) and/or data. Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 includes a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 reads from and/or writes to removable storage unit 1618 in a well-known manner.

According to an exemplary embodiment, secondary memory 1610 may include other means, instrumentalities or other approaches for allowing computer programs and/or other instructions and/or data to be accessed by computer system 1600. Such means, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 enables computer system 1600 to communicate and interact with any combination of remote devices, remote networks, remote entities, etc., (individually and collectively referenced by reference number 1628). For example, communication interface 1624 may allow computer system 1600 to communicate with remote devices 1628 over communications path 1626, which may be wired, and/or wireless, and which may include any combination of LANs, WANs, the Internet, etc. Control logic and/or data may be transmitted to and from computer system 1600 via communication path 1626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 16. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A smart card reader system comprising:
    a card reader cavity, comprising:
        a rod with a roller in a home position that seals the card reader cavity;
        a secure card reader (SCR) holder bonded to a printed circuit board (PCB), wherein the PCB comprises an SCR spring contact connector;
        wherein the card reader cavity is configured to receive a smart card including an integrated circuit (IC), wherein the IC is coupled to the SCR spring contact connector, wherein the receiving comprises a motion of the rod from the home position, wherein the motion is constrained by parallel guide slots of parallel guide plates, wherein the parallel guide slots are straight, and wherein a retraction angle, $\theta$, comprises an angle between a retraction direction and a direction of an insertion of the smart card; and
    a processor coupled to the SCR spring contact connector, wherein the processor is configured to:
        receive an input regarding a transaction using data of the smart card; and
        based on the input, execute the transaction.

2. The smart card reader system of claim 1, wherein the roller comprises a conformable material supported by the rod, wherein the conformable material and the rod rotate as a single unit according to the conformable material making contact with the smart card.

3. The smart card reader system of claim 2, wherein the rod comprises a metal or a plastic, and wherein the conformable material comprises rubber, foam, silicon, or an elastomer.

4. The smart card reader system of claim 1, wherein the card reader cavity comprises a side structure and bottom structure, wherein the roller in the home position makes contact with both the side structure and the bottom structure to prevent a liquid from entering the card reader cavity.

5. The smart card reader system of claim 1, wherein each end of the rod protrudes through a parallel guide slot of the parallel guide slots, and wherein each end of the rod includes a rod end cap whose diameter is larger than a width of the parallel guide slot.

6. The smart card reader system of claim 1, further comprising:
    a seal-force spring anchored to a housing structure of the smart card reader system, wherein a spring lever arm of the seal-force spring presses against the rod to apply a sealing force, F, in a direction opposite the retraction direction.

7. The smart card reader system of claim 6, wherein a horizontal component of the sealing force, F, equals $F \cos \theta$ and a vertical component of the sealing force, F, equals $F \sin \theta$, wherein $\theta$ is the retraction angle.

8. The smart card reader system of claim 1, wherein values of the retraction angle, $\theta$, are greater than or equal to 40° and less than or equal to 50°.

9. A smart card reader system comprising:
a card reader cavity, comprising:
- a rod with a roller in a home position that seals the card reader cavity, wherein the card reader cavity is configured to receive a smart card, wherein the smart card being inserted into the card reader cavity moves the rod from the home position according to a retraction direction based on a retraction angle, θ, and wherein the retraction angle, θ, comprises an angle between a direction of a displacement vector and a direction of an insertion of the smart card;
- a secure card reader (SCR) holder bonded to a printed circuit board (PCB), wherein the PCB comprises an SCR spring contact connector, and wherein the smart card comprises an integrated circuit (IC), the smart card is positioned where the IC is coupled to the SCR spring contact connector; and
- a processor coupled to the SCR spring contact connector, wherein the processor is configured to:
  - receive an input regarding a transaction using data of the smart card; and
  - based on the input, execute the transaction.

10. The smart card reader system of claim 9, wherein the card reader cavity comprises a liquid impervious seal that separates the card reader cavity from an interior of the smart card reader system.

11. The smart card reader system of claim 10, wherein the liquid impervious seal comprises an elastomer gasket.

12. The smart card reader system of claim 10, wherein interior surfaces of the card reader cavity comprise a liquid-impervious conformal coating.

13. The smart card reader system of claim 9, wherein the roller comprises a conformable material supported by a rod, wherein the conformable material and the rod rotate as a single unit according to the conformable material making contact with the smart card.

14. The smart card reader system of claim 13, wherein the rod comprises a metal or a plastic, and wherein the conformable material comprises rubber, foam, silicon, or an elastomer.

15. The smart card reader system of claim 9, wherein values of the retraction angle, θ, are greater than or equal to 40° and less than or equal to 50°.

16. The smart card reader system of claim 9, wherein the card reader cavity comprises a side structure and bottom structure, wherein the roller in the home position makes contact with both the side structure and the bottom structure to prevent a liquid from entering the card reader cavity.

17. The smart card reader system of claim 16, wherein a horizontal component of the sealing force, F, equals $F \cos \theta$ and a vertical component of the sealing force, F, equals $F \sin \theta$, wherein θ is the retraction angle.

18. The smart card reader system of claim 9, further comprising:
- a seal-force spring anchored to a housing structure of the smart card reader system, wherein a spring lever arm of the seal-force spring presses against the rod to apply a sealing force, F, in a direction opposite the retraction direction.

* * * * *